United States Patent
Shindoh et al.

[11] Patent Number: 6,102,000
[45] Date of Patent: *Aug. 15, 2000

[54] FUEL INJECTION APPARATUS FOR ENGINE

[75] Inventors: Kenichiro Shindoh; Akihiro Yamanaka; Katsuhiko Hirose, all of Susono; Akira Shibata, Anjo; Yoshitsugu Inaguma, Oobu; Kenzo Yano, Okazaki; Tatsuya Ichikawa, Kariya, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/781,166

[22] Filed: Jan. 9, 1997

Related U.S. Application Data

[63] Continuation-in-part of application No. 08/333,094, Nov. 1, 1994, abandoned.

[30] Foreign Application Priority Data

Nov. 2, 1993 [JP] Japan .................................. 5-274666
Jan. 1, 1994 [JP] Japan .................................. 6-000617

[51] Int. Cl.$^7$ ............................. F02D 7/00; F02M 7/00
[52] U.S. Cl. ......................................... 123/381; 123/446
[58] Field of Search .................... 123/446, 447, 123/381, 494, 449

[56] References Cited

U.S. PATENT DOCUMENTS

| | | |
|---|---|---|
| 3,844,263 | 10/1974 | Endo . |
| 4,337,650 | 7/1982 | Brandt . |
| 4,359,032 | 11/1982 | Ohie . |
| 4,438,496 | 3/1984 | Ohie . |
| 4,492,196 | 1/1985 | Oshizawa . |
| 4,494,507 | 1/1985 | Yasuhara . |
| 4,502,438 | 3/1985 | Yasuhara . |
| 4,503,820 | 3/1985 | Nakagawa . |
| 4,788,960 | 12/1988 | Oshizawa . |
| 4,817,575 | 4/1989 | Hofer . |
| 5,241,933 | 9/1993 | Morikawa . |

FOREIGN PATENT DOCUMENTS

| | | |
|---|---|---|
| 0 501 459 | 2/1992 | European Pat. Off. . |
| 57-32021A | 2/1982 | Japan . |
| 57-62935A | 4/1982 | Japan . |
| 57-102526A | 6/1982 | Japan . |
| 58-70028A | 4/1983 | Japan . |
| 59-185839A | 10/1984 | Japan . |
| 61-28735A | 2/1986 | Japan . |
| 61-135980A | 6/1986 | Japan . |
| 62-210242A | 9/1987 | Japan . |
| 62-291453A | 12/1987 | Japan . |
| 1-502440A | 8/1989 | Japan . |
| 2 109 476 | 6/1993 | United Kingdom . |

*Primary Examiner*—Carl S. Miller
*Attorney, Agent, or Firm*—Kenyon & Kenyon

[57] ABSTRACT

A fuel injection apparatus for a diesel engine has a fuel injection pump for feeding fuel under pressure and fuel injection nozzles provided in the engine to inject fuel fed from the injection pump. A pressure sensor for detecting fuel pressure is provided in a midway in a fuel line connecting the injection pump to the injection nozzles. An electronic control unit (ECU) computes the frequency of the fuel pressure based on a detected value from the pressure sensor immediately after fuel is injected from the injection nozzles. The ECU then computes a fuel bulk modulus based on the result of the computation of the frequency of the fuel pressure. Based on the computed bulk modulus, the ECU computes a fuel injection start and end time. Further, the ECU adjusts an instruction value for fuel injection control based on the result of the computation of injection start and end, and controls the injection pump based on the adjusted instruction value.

23 Claims, 22 Drawing Sheets

Fig. 26
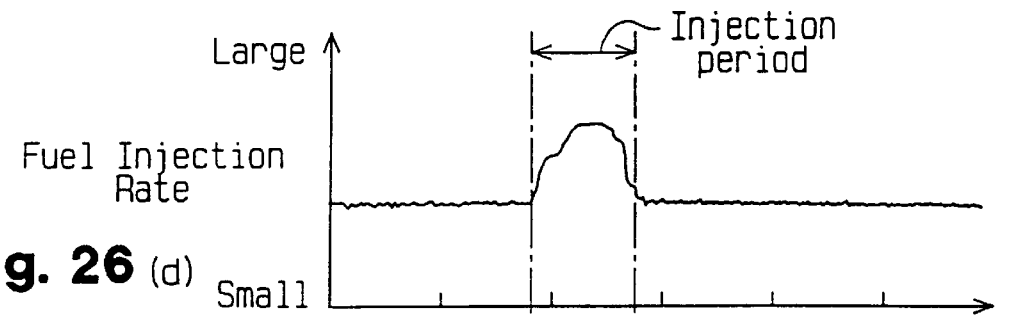
Fig. 26 (d)
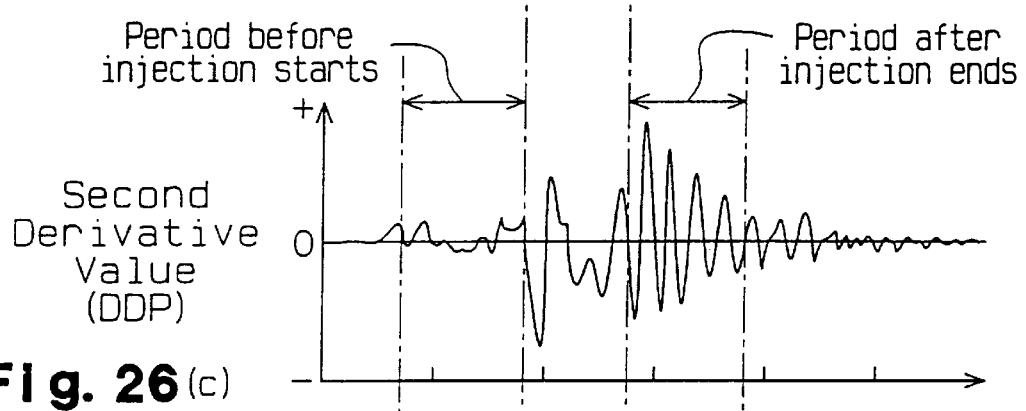
Fig. 26 (c)
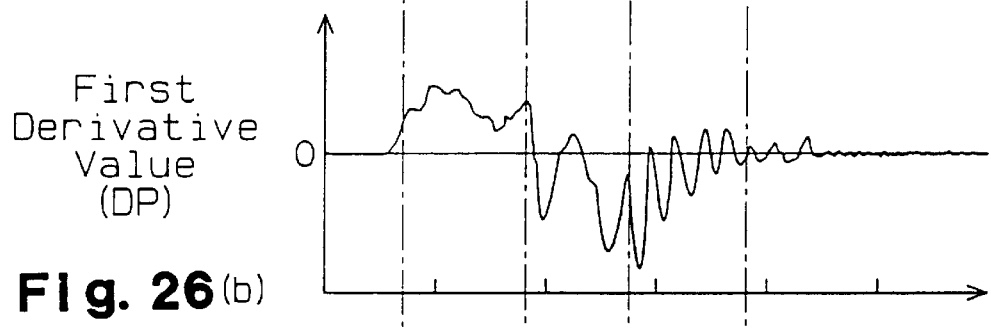
Fig. 26 (b)
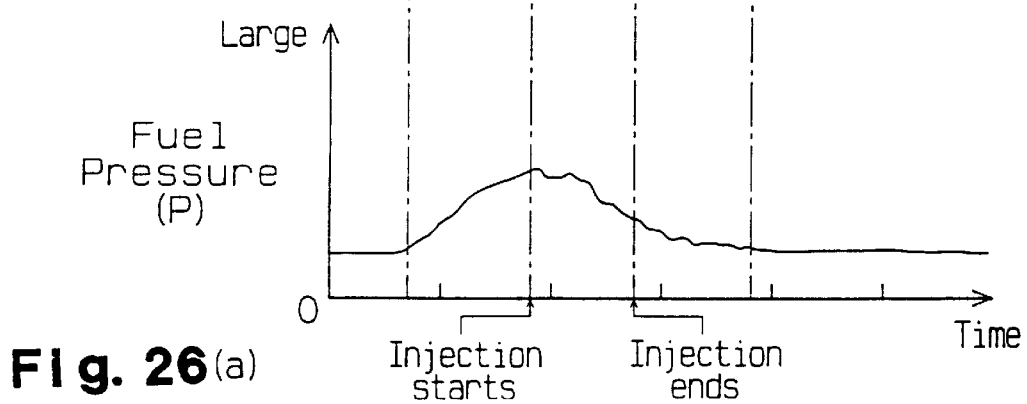
Fig. 26 (a)

FUEL INJECTION APPARATUS FOR ENGINE

This application is a continuation-in-part of application Ser. No. 08/333,094, filed Nov. 1, 1994 now abandoned.

BACKGROUND OF THE INVENTION

1. Field of the Invention

The present invention relates to an apparatus for injecting fuel into an engine, and more particularly, to a computer controlled fuel injection apparatus which optimizes fuel injection control based on variations in detected fuel pressure.

2. Description of the Related Art

Two of the main components in conventional fuel injection systems used in diesel and other types of engines are a fuel injection pump 151 and injection nozzles 152 as shown in FIG. 30. Each injection nozzle 152 operates to inject fuel, supplied under high pressure by the injection pump 151, into a combustion chamber 154 of an engine 153. The amount of fuel injected into the combustion chamber 154 is variously controlled by fuel injection timing according to changing engine operating parameters. The fuel injection apparatus used in the electronically controlled diesel engine, for example, utilizes a fuel pump 151 activated by a plunger 155 to compress fuel in a high pressure chamber 156 inside the pump 151. The high-pressure fuel is then fed to the injection nozzle 152 from which it is injected into the combustion chamber 154.

A computer 157 or other type of electronic device typically controls the injection pump 151. The computer 157 or electronic device first computes a desired or target value of fuel to be injected in the engine 153 based on detected engine operating conditions. Then, based on the computed target value, the computer 157 controls an electromagnetic coil 158 provided in the injection pump 151 to open a spill valve 159 (or a spill ring in other pump types). Next, the high pressure chamber 156 opens to a fuel chamber 160 allowing fuel to spill into the fuel chamber 160 from the high pressure chamber 156. The amount of fuel supplied during any single injection operation depends directly on the time which the injector pump 151 begins and ends its supply of pressurized fuel to the injection nozzle 152 and combustion chamber 154.

The computer 157 accomplishes this by computing a target value for injection timing in accordance with various engine operating conditions. The computed target value is then used by the computer 157 to control a timer device 161 provided in the injection pump 151, which in turn, controls the movement of the plunger 155. In this way, the computer 157 controls the action of the plunger 155 to begin the supply of pressurized fuel from the injection pump 151 to the injection nozzle 152, and ultimately, to the combustion chamber 154.

Even with such electronically precise control over the timing and amount of fuel injection, time dependent mechanical changes as well as changes in fuel characteristics tend to compromise the performance of fuel injection control. Instances of this occur given variations in fuel viscosity and mechanical component part degradation. In particular, when the temperature of fuel fluctuates, fuel viscosity undergoes a significant change. This change directly affects fuel injection. In addition, over long periods of time, the component parts of the fuel injector will normally degrade or show signs of wear. Unless these factors are considered in the timing control of the fuel injection, the actual amount of fuel injected and its timing will inevitably vary from desired target values. These factors, in turn, compromise engine emissions, e.g., increasing the amounts of nitrogen oxides (NOx) and other harmful compounds exhausted from the engine 153.

Japanese Unexamined Patent Publication No. 62-291453 proposes a simple structure to control the amount of fuel injected by an injection pump, that accounts for variations in fuel viscosity. In this apparatus, a hydraulic timer has a hydraulic piston and a cylinder provided in the injection pump. The computer first determines the degree of fuel viscosity based on detected changes in the speed of the reciprocating piston, and then, utilizes the detected fuel viscosity to ultimately adjust the fuel injection control.

According to the control apparatus in the '453 unexamined patent publication, however, fuel viscosity determinations are made irrespective of considerations such as variations in the particular manufacturing tolerance of the piston and cylinder in any given timing apparatus. Likewise, nothing is provided in this fuel injection control system which accounts for the wearing out or the mechanical failure of timing apparatus piston and cylinder. Such failures are often directly dependent on engine speed and load. Consequently, the control apparatus disclosed in the '453 unexamined patent publication is ill-suited to make precise fuel viscosity determinations under various engine speeds and loads. This, in effect, prevents precise fuel injection control.

SUMMARY OF THE INVENTION

Accordingly, it is a primary objective of the present invention to provide a fuel injection apparatus for an engine, which can accurately detect variations in fuel viscosity and other characteristics of the fuel in the fuel system to optimize the fuel injection control.

It is another objective of this invention to provide a fuel injection apparatus for an engine, having an accurate means to determine the end of fuel injection cycle, despite variations in fuel viscosity and other fuel characteristics, in order to optimize the fuel injection control.

It is a further objective of this invention to provide a fuel injection apparatus for an engine, which can consistently determine the beginning of the fuel injection cycle, despite variations in fuel viscosity and other fuel characteristics in order to optimize the fuel injection control.

To achieve the foregoing and other objects and in accordance with the purpose of the present invention, a fuel injection apparatus is provided. The apparatus has a fuel injection pump connected with a plurality of fuel injection nozzles by way of a plurality of fuel passages. The injection pump pumps out a required amount of fuel under high pressure at a required timing. The fuel is supplied to the injection nozzles through the fuel passages to be injected to an engine from the injection nozzles. The fuel pressure in the passages fluctuates with respect to time. The apparatus comprises a detecting device for detecting fuel pressure in each fuel passage, a computing device for computing a fuel pressure frequency in accordance with the detected fuel pressure, a correction devices for correcting the amount of the fuel to be injected and/or the injection timing in accordance with the computed fuel pressure frequency and a control device for controlling the injection pump in accordance with the value corrected by the correction device.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1 is a diagram illustrating the schematic structure of an engine system;

FIG. 2 is a cross-sectional view showing a distribution type fuel injection pump;

FIG. 3 is a block diagram illustrating an electronic control unit (ECU) used as part of a fuel injection control system;

FIG. 4 is a flowchart illustrating a "counting routine" that is executed by the ECU;

FIG. 5 is a flowchart illustrating a "fuel bulk modulus computing routine" that is executed as part of fuel injection control performed by the ECU;

FIG. 6 is a continuation of the flowchart illustrated in FIG. 5;

FIG. 7 is a flowchart illustrating a "fuel injection control routine" executed by the ECU;

FIGS. 8a–8d are timing charts illustrating the pressure characteristics of the fuel at the time of a single fuel injection, its first derivative value (or first differential value), its second derivative value (or second differential value) and a corresponding fuel injection rate, respectively;

FIG. 9 is a timing chart showing behavior of the second derivative value of the fuel pressure;

FIG. 10 is a graph illustrating the relation between fuel bulk modulus and the time at which fuel injection timing begins; and FIG. 11 is a graph illustrating the relation between fuel bulk modulus and the amount of fuel injected by the fuel injector.

FIG. 12 is a flowchart illustrating a "fuel grade determining routine" executed by the ECU;

FIG. 13 is a continuation of the "fuel grade determining routine" illustrated in FIG. 12;

FIG. 14 is a graph explaining a method of predicting a fuel grade from the relation between the fuel temperature and the fuel bulk modulus;

FIG. 15 is a flowchart illustrating a "fuel injection control routine" executed by the ECU; and FIG. 16 is a graph showing the relation of a target injection amount set for each fuel grade with the engine speed and acceleration pedal angle.

FIG. 17 is a flowchart illustrating a "fuel pressure processing routine" executed by the ECU;

FIG. 18 is a flowchart illustrating a "fuel bulk modulus computing routine" executed by the ECU; and FIG. 19 is a time chart showing the behavior of the fuel pressure at the time of single fuel injection, the period for computing an average pressure change at that time, etc.

FIG. 20 is a flowchart illustrating a "fuel grade determining routine" executed by the ECU;

FIG. 21 is a continuation of the routine illustrated in FIG. 20; and

FIG. 22 is a timing chart illustrating the behavior of the second derivative value of the fuel pressure.

FIG. 23 is a flowchart illustrating a "Routine for determining the end of a fuel injection cycle" executed by the ECU;

FIG. 24 is a graph illustrating the frequency of changes in fuel pressure based on the second derivative value of the fuel pressure;

FIG. 25 is a flowchart illustrating a "fuel system diagnostic routine" executed by the ECU.

FIGS. 26 through 29 illustrate a 6th embodiment of the present invention adapted for a diesel engine system equipped with a booster.

FIGS. 26a–26d are timing charts illustrating the behavior of the fuel pressure at the time of single fuel injection, its first derivative value, its second derivative value and a fuel injection rate respectively;

FIG. 27 is a flowchart illustrating a "routine for detecting the start and the end of fuel injection cycle" executed by the ECU;

FIG. 28 is a flowchart illustrating a "ΔQ computing routine" executed by the ECU; and FIG. 29 is a flowchart illustrating a "fuel injection control routine" executed by the ECU.

DETAILED DESCRIPTION OF THE PREFERRED EMBODIMENTS

Fuel injection apparatuses for an engine according to the first to seventh embodiments of the present invention will be described below. The basic mechanical and electrical structures of the fuel injection apparatus for an engine embodying this invention will be discussed in the section of the first embodiment. With regard to the basic structures, only those different from the basic structures of the first embodiment will be discussed in the sections of the second to seventh embodiments.

First Embodiment

Figure 1:
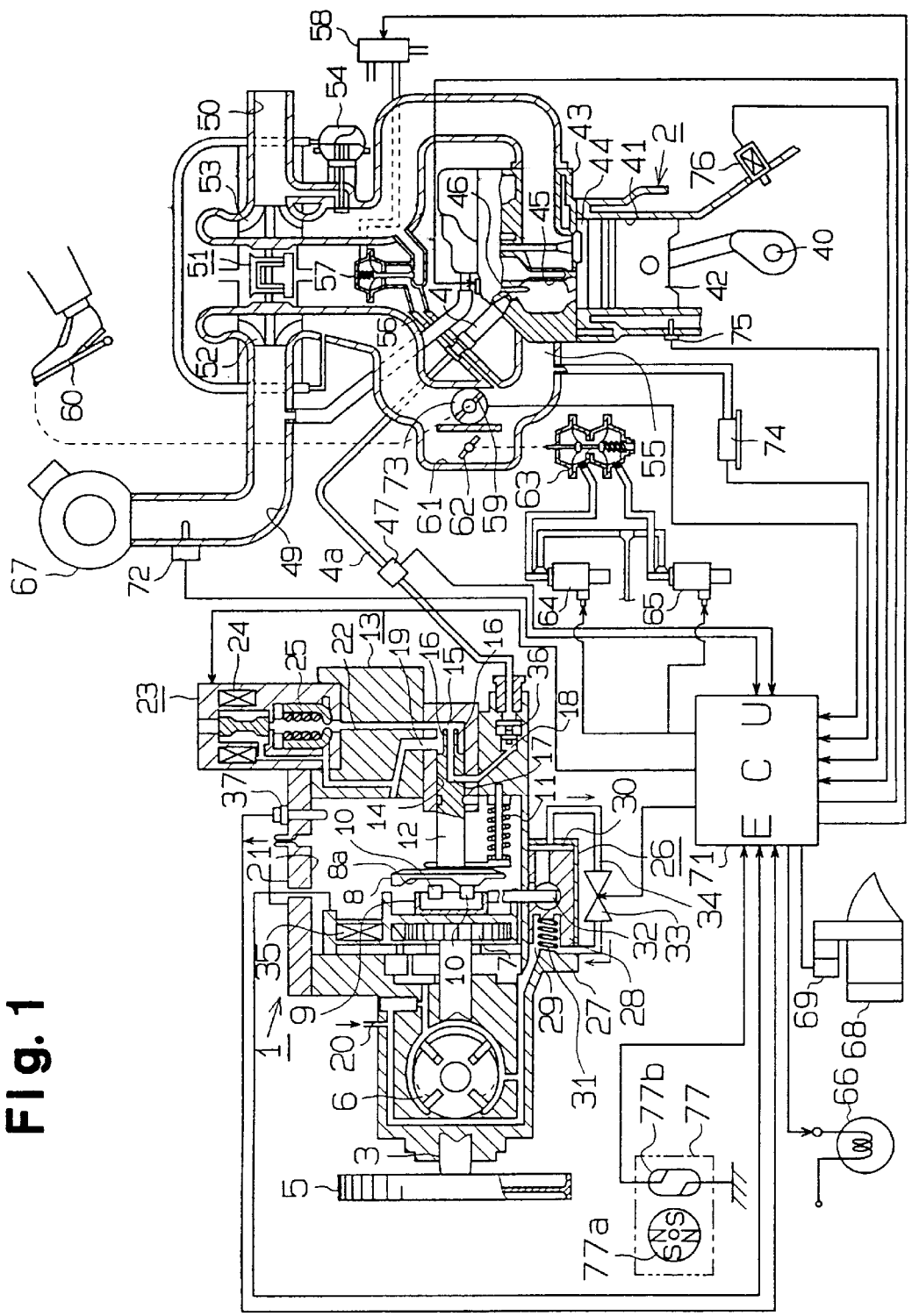
FIGS. 1 through 11 illustrate a first embodiment of the present invention adapted for a diesel engine system equipped with a booster.
Figure 2:
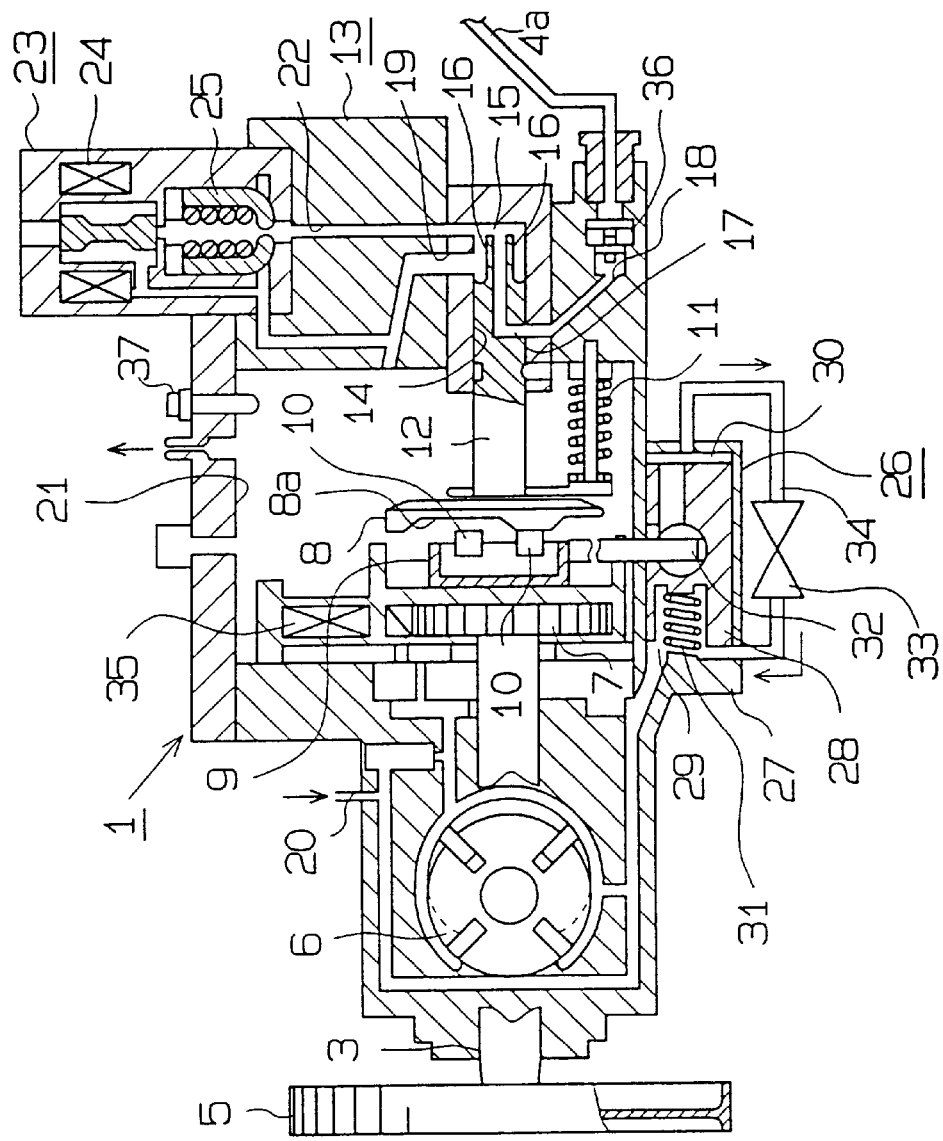

FIG. 1 illustrates the schematic of a diesel engine system equipped with a booster, while FIG. 2 is an enlargement of the distribution type fuel injection pump shown in FIG. 1. The diesel engine system according to this embodiment comprises a diesel engine coupled to the power transmission device of an automobile and a fuel injection pump 1 for supplying high-pressure fuel to the engine 2. The engine 2 has a plurality of cylinders (four in this embodiment). A plurality of fuel injection nozzles 4 provided in the respective cylinders receive the fuel fed under pressure from the fuel injection pump 1 via fuel lines 4a. The fuel injection pump 1 has a drive shaft 3. A drive pulley 5 fixed to the left-hand end (distal end) of the drive shaft 3 in the diagram receives power transmitted via a belt or the like (not shown) from a crankshaft 40 of the engine 2. As the engine 2 is driven, the shaft 3 rotates to drive the injection pump 1 so that the pump 1 feeds fuel under pressure to each injection nozzles 4 of the engine 2 via the fuel line 4a.

In this embodiment, each injection nozzle 4 incorporates a needle valve and a spring for adjusting the opening of the needle valve. The needle valve opens upon reception of a fuel pressure P equal to or higher than a predetermined value. When the fuel pressure P reaches or exceeds the predetermined value, that pressure is applied to each injection nozzle 4 by the injection pump 1. The injection nozzle 4 then injects fuel to the associated cylinder.

A low pressure fuel transfer pump 6 (shown rotated by 90 degrees about a vertical axis in this diagram so its details can be seen) provided in the injection pump 1 comprises a Bene type pump which receives power from the shaft 3. A pulsar 7 provided at the right-hand end (proximal end) of the shaft 3 in the diagram has a disk shape and has a plurality of projections forming teeth on its outer surface (56 projections in this embodiment). This pulsar 7 has a plurality of cut teeth, here four sets for a total of eight teeth in this embodiment, arranged at equal angular intervals on its outer surface in association with the number of cylinders of the engine 2. The pulsar 7 has 14 projections arranged at equal angular intervals between the plural sets of cut teeth.

The proximal end of the shaft 3 is connected to a cam plate 8 via a coupling (not shown). The dish shaped cam plate 8 has cam faces 8a on one side. A roller ring 9, provided between the pulsar 7 and the cam plate 8, has a plurality of cam rollers 10 facing the cam faces 8a and arranged in a circumferential direction. The number of the cam faces 8a equal the number of the cylinders of the engine 2. A spring 11, provided adjacent to the cam plate 8, urges this plate 8 in the direction for engagement with the cam rollers 10.

A plunger 12 attached to the cam plate 8 serves to compress the fuel. The cam plate 8 and the plunger 12 rotate together with the rotation of the shaft 3. More specifically, when the rotational moment of the shaft 3 is transmitted to the cam plate 8 via the coupling, the plate 8 rotates while engaged with the cam rollers 10. Both the cam plate 8 and the plunger 12 undergo revolving and reciprocating movement, with reciprocation being performed in the horizontal direction, referring to FIG. 2. The number of times the cam plate 8 and plunger 12 reciprocate depends on the number of cylinders in the engine 2. The plunger 12 moves forward while the cam faces 8a move over the cam rollers 10 of the roller ring 9, and the plunger 12 moves backward while the cam faces 8a move under the cam rollers 10.

A pump housing 13 of the injection pump 1 houses a cylinder 14 assembled to the plunger 12. A high pressure chamber 15 is defined in the cylinder 14 between the right-hand end (distal end face) of the plunger 12 in the diagram and the end face of the cylinder 14. The plunger 12 has suction grooves 16, equal in number to the cylinders of the engine, and a distributing port 17 on the outer surface on the distal end side. This housing 13 has distribution passages 18 and a suction port 19 which are associated with the suction grooves 16 and the distribution port 17.

In this embodiment, a delivery valve 36 provided on the outlet side of each distribution passage 18 is a constant pressure valve (CPv). This valve 36 prevents the counterflow of the fuel, fed under pressure to the fuel line 4a, along each distribution passage 18, and opens the passage 18 when the fuel pressure P reaches a predetermined value or higher.

In response to the rotation of the shaft 3, fuel supplied from a fuel tank (not shown) enters the transfer pump via supply port 20. The fuel next enters a fuel chamber 21 from the transfer pump 6. During the backward movement of the plunger 12, i.e., during the suction stroke, the suction grooves 16 communicate with the suction port 19, the high pressure chamber 15 is de-pressurized and fuel is supplied to the high pressure chamber 15 from the fuel chamber 21. In the compression stroke in which the high pressure chamber 15 is pressurized in accordance with the forward movement of the plunger 12, the fuel is supplied under pressure to each injection nozzle 4 of the associated cylinder via the associated fuel line 4a from the associated distribution passage 18.

A spill passage 22 provided between the high pressure chamber 15 and the fuel chamber 21 in the housing 13 permits fuel spillage from the high pressure chamber 15 to the fuel chamber 21. An electromagnetic spill valve 23 provided midway in this spill passage 22 regulates fuel spillage from the high pressure chamber 15. This spill valve 23, which is normally open, has a valve body 25 that opens the spill passage 22 when a coil 24 is deenergized, causing the fuel in the high pressure chamber 15 to spill into the fuel chamber 21. On the other hand, when the coil 24 is energized, the valve body 25 closes the spill passage 22 to block fuel spillage into the fuel chamber 21 from the high pressure chamber 15.

The energization of the electromagnetic spill valve 23, therefore, controls the opening and closing of the spill passage 22 by this valve 23, and in turn regulates the fuel spillage into the fuel chamber 21 from the high pressure chamber 15. When the electromagnetic spill valve 23 opens the spill passage 22 in the compression stroke of the plunger 12, the high pressure chamber 15 is de-pressurized, stopping the injection of the fuel from each injection nozzle 4. Even though the plunger 12 moves forward when the spill passage 22 is opened by the electromagnetic spill valve 23, fuel pressure in the high pressure chamber 15 will not increase preventing any fuel from being injected from the injection nozzles 4. Due to the control of the electromagnetic spill valve 23 over the opening the spill passage 22, during the forward movement of the plunger 12, adjustment can thereby be made to the timing when fuel injection from the injection nozzles 4 should end. This directly controls the amount of fuel injected through the injection nozzles 4.

A timer apparatus 26 (shown rotated by 90 degrees about a vertical axis in this diagram so its details can be seen) provided at the bottom side of the housing 13 controls the timing for ending fuel injection from each injection nozzle 4 to the lead angle side or the delay angle side. This timer apparatus 26 changes the rotational phase of the roller ring 9 with respect to the rotational direction of the shaft 3. This changes the timing at which the cam faces 8a start engaging the associated cam rollers 10. That is, timer 26 changes the timing at which the plunger 12 starts moving forward.

The timer apparatus 26, which is driven hydraulically, has a timer housing 27 and a timer piston 28 assembled inside the housing 27. The spaces corresponding to both ends of the piston 28 in the housing 27 are a low pressure chamber 29 and a pressurizing chamber 30. A timer spring 31 provided in the low pressure chamber 29 urges the piston 28 toward the pressurizing chamber 30. A slide pin 32, extending upward from the piston 28, couples the piston 28 to the roller ring 9. As the slide pin 32 pivots or tilts due to the movement of the piston 28, the roller ring 9 rotates.

The fuel compressed by the low pressure fuel transfer pump 6 is supplied to the pressurizing chamber 30. The equilibrium maintained between the fuel pressure in the pressurizing chamber 30 and the urging force of the spring, controls the time at which the plunger 12 reciprocates, which in turn controls fuel injection timing.

Specifically, the time at which cam plate 8 contacts the rollers of roller ring 9 is determined by the rotational position of the roller rings 9. With the rings at one position, the revolving cam plate 8 makes contact with the roller rings 9 at a given time. Changing the rotation position of the ring 9, changes the time at which the cam plate 8 contacts the rings 9. Therefore, when the position of plunger 12 changes, the pivotal movement of slide pin 32 causes the rotation of roller ring 9, thus changing the timing at which the cam plate 9 contacts the ring 9. This in turn regulates the timing of the reciprocating movement of piston 12, and hence that of the fuel injection timing.

The timer apparatus 26 uses the fuel pressure as hydraulic pressure to operate the injection pump 1. An electromagnetic time control valve (TCV) 33 provided in the timer apparatus 26 adjusts the fuel pressure. A communication passage 34 provided between the pressurizing chamber 30 and the low pressure chamber 29 connects chambers 30 and 29. The TCV 33, provided midway in the communication passage 34, acts based on a duty ratio controlled energization signal (not shown). As the TCV 33 adjusts the opening of the communication passage 34, the fuel pressure in the pressurizing chamber 30 is also adjusted. This in turn further controls the time at which the plunger 12 starts moving forward, and in effect controls the beginning of a particular fuel injection timing cycle.

An engine speed sensor 35 provided above the roller ring 9 comprises an electromagnetic pickup and faces the outer surface of the pulsar 7. When the projections and cut teeth of the pulsar 7 cross close to the sensor 35, the sensor 35 detects the passing of the projections and cut teeth and outputs a pulse signal representing the detection. This sensor 35 outputs an engine speed pulse signal every given crank angle. Based on the passing of the cut teeth, the sensor 35 outputs a pulse signal indicating a reference position for every given crank angle. Further, the sensor 35 outputs a series of engine speed pulse signals to obtain the engine speed NE. As the sensor 35 is provided integrally with the roller ring 9, it can provide a reference engine speed pulse signal at the constant timing with respect to the movement of the plunger 12, even if the rotational position of the roller ring 9 is changed by the timer apparatus 26.

In addition, a fuel temperature sensor 37 provided in the housing 13 detects the temperature THF of the fuel retained in the fuel chamber 21.

The structure of the diesel engine 2 will be described with reference to FIG. 1. This engine 2 has cylinder bores 41, pistons 42 and a cylinder head 43, which define a plurality of main combustion chambers 44 associated with the individual cylinders. A plurality of sub-combustion chambers 45 formed in the cylinder head 43 are connected to the respective main combustion chambers 44. Fuel is injected into each sub-combustion chamber 45 from the associated injection nozzle 4. Glow plugs 46 provided in association with the individual sub-combustion chambers 45 constitute a device for helping start the engine 2.

In this embodiment, a pressure sensor 47 provided in each fuel line 4a detects the fuel pressure P between the injection pump 1 and each injection nozzle 4, and outputs a signal corresponding to the level of the detected value.

An air-intake passage 49 and an exhaust passage 50 provided in the engine 2 are connected to the individual cylinders. A compressor 52 provided in the air-intake passage 49 and a turbine 53 provided in the exhaust passage 50 constitute a turbo charger 51 as a booster. A waste gate valve 54 provided in the exhaust passage 50 regulates the amount of the exhaust gas flowing into the turbine 53. It is well known that the turbo charger 51 uses exhaust gas energy to rotate the turbine 53 and the compressor 52 provided on a shaft to boost air intake. As the pressure of the intake air increases, high density air is sent to the main combustion chambers 44. A good portion of the fuel injected in each main combustion chamber 44 from the associated sub-combustion chamber 45 is burned by the high density air, increasing the output of the engine 2. As the angle of the waste gate valve 54 is adjusted, the pressure of the intake air obtained by the turbo charger 51 or turbo-boost pressure is also adjusted.

An exhaust gas recirculation passage (EGR passage) 56 provided between the air-intake passage 49 and the exhaust passage 50 recirculates part of the exhaust gas flowing in the exhaust passage 50, to the vicinity of an exhaust port 55. An EGR valve 57 provided midway in the EGR passage 56 and actuated on the basis of the negative pressure, adjusts the amount of recirculated exhaust gas (EGR amount). An electric vacuum regulating valve (EVRV) 58 regulates the supply of the negative pressure to the EGR valve 57. As the EGR valve 57 is driven based on the negative pressure adjusted by the EVRV 58, the EGR amount flowing to the suction port 55 via the EGR passage 56 from the exhaust passage 50 is adjusted.

A throttle valve 59, provided midway in the air-intake passage 49, operates in response to the thrusting of an acceleration pedal 60. A bypass passage 61 located by the throttle valve 55 in the air-intake passage 49 provides a bypass for the flow of the intake air. A bypass restriction valve 62 provided in this passage 61 is actuated by driving an actuator 63 of a double diaphragm chamber type. The energization of two vacuum switching valves (VSVs) 64 and 65 is controlled to drive this actuator 63. For example, this bypass restriction valve 62 is controlled to be half open to reduce the vibration noise or the like when the engine 2 is idling. This bypass restriction valve 62 is opened fully under the normal driving conditions and is fully closed stopping the engine 2 when driving is halted.

An alarm lamp 66 provided proximate to the driver's seat (not shown) in an automobile is lit to inform the driver of the deterioration of the fuel injection apparatus including the injection pump 1 and the injection nozzles 4. This alarm lamp 66 is activated based on the detection of an abnormality in fuel injection, which will be discussed later.

An electronic control unit (ECU) 71, performs engine system control over the aforementioned electromagnetic spill valve 23, TCV 33, glow plugs 46, EVRV 58, VSVs 64 and 65 and alarm lamp 66 in this embodiment.

In addition to the aforementioned engine speed sensor 35, there are various other sensors (which will be discussed shortly) to detect various parameters concerning the driving conditions of the engine 2. An air temperature sensor 72, provided near an air cleaner 67 at the inlet of the air-intake passage 49, detects the temperature, THA, of air fed into the air-intake passage 49 (air temperature) and outputs a signal corresponding to the detected value. An acceleration pedal sensor 73, provided near the throttle valve 59, detects the acceleration pedal angle ACCP (corresponding to the load state of the engine 2), and outputs a signal corresponding to the detected value. A manifold pressure sensor 74, provided near the suction port 55, detects the pressure, PiM, of the intake air boosted by the turbo charger 51 (boosted turbo pressure), and outputs a signal corresponding to the detected value. A coolant temperature sensor 75, provided in the engine 2, detects the temperature, THW, of the coolant of the engine 2 (coolant temperature) and outputs a signal corresponding to the detected value. A crank angle sensor 76, provided in the engine 2, detects the rotational position of the crankshaft 40, such as for example, the top dead center of a specific cylinder, and outputs a signal corresponding to the detected value. Further, a vehicle speed sensor 77 provided in a transmission (not shown) detects a vehicle speed SPD. This sensor 77 has a magnet 77a that is rotated by the drive shaft of the transmission, and outputs a pulse signal corresponding to the vehicle speed SPD when a lead switch 77b is periodically enabled by the magnet 77a.

A starter 68 provided in the engine 2 rotates or cranks the crankshaft 40 at engine ignition. The starter 68 has a starter switch 69 to detect the ON/OFF status of the starter 68. As is well known, the starter 68 is turned on or off based on the manipulation of an ignition switch (not shown). At the time the starter 48 is actuated by the manipulation of the ignition switch, the starter switch 69 outputs a starter signal ST indicating the ON status.

The ECU 71 receives various signals from the aforementioned various sensors 35, 37, 47, and 72 to 77 and the switch 69, and controls the electromagnetic spill valve 23, TCV 33, glow plugs 46, EVRV 58 and VSVs 64 and 65, alarm lamp 66 and so forth based on the received signals.

Figure 3:
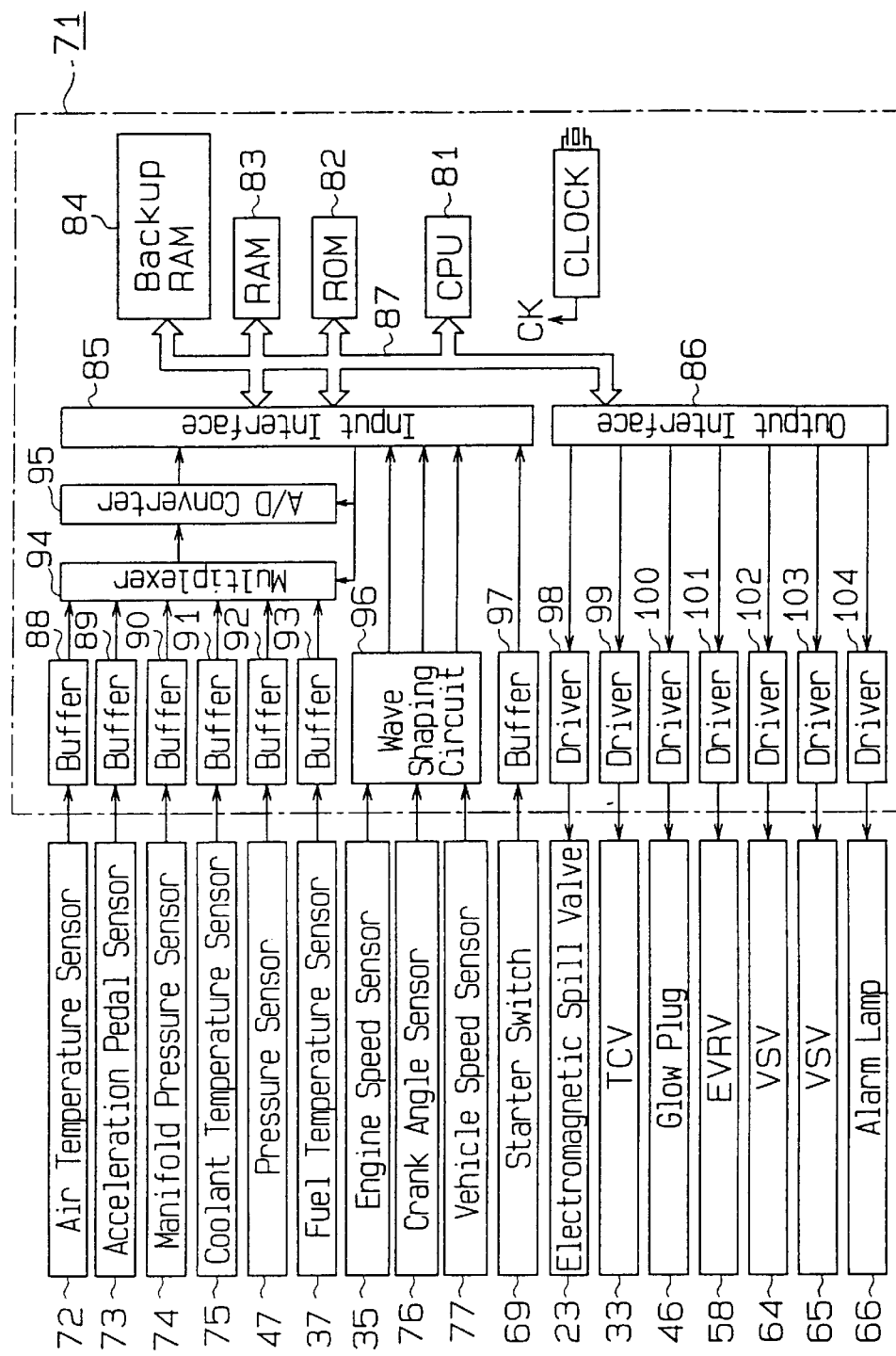

The structure of the ECU 71 will be described below with reference to the block diagram in FIG. 3. The ECU 71 includes a central processing unit (CPU) 81, a read only memory (ROM) 82, a random access memory (RAM) 83, and a backup RAM 84. Stored in advance in the ROM 82 are predetermined control programs, maps, etc. The RAM 83 temporarily stores the results of operations performed by the CPU 81. The backup RAM 84 saves temporarily stored data. The ECU 71 is a network of transistors, capacitors, resistors and other electronic components which perform logical operations based on the aforementioned signals. Individual components 81–84 of the ECU are connected to an input interface 85 and an output interface 86 by a bus 87.

Various signals output from the aforementioned air temperature sensor 72, acceleration pedal sensor 73, manifold pressure sensor 74, coolant temperature sensor 75, pressure sensors 47 and fuel temperature sensor 37 are input to the input interface 85 via individual buffers 88, 89, 90, 91, 92 and 93, a multiplexer 94 and an A/D converter 95. Various signals output from the aforementioned engine speed sensor 35, crank angle sensor 76 and vehicle speed sensor 77 are input to the input interface 85 via a wave shaping circuit 96. A signal output from the starter switch 69 is input to the input interface 85 via a buffer 97. The CPU 81 reads the various signals input to the input interface 85 as input values, and performs desired processes, such as computations, to control the electromagnetic spill valve 23, TCV 33, glow plugs 46, EVRV 58, VSVs 64 and 65, alarm lamp 66, etc. For instance, the CPU 81 executes various operations associated with fuel injection control or other controls, which will be discussed later. Further, the CPU 81 outputs control signals according to the processing results to the individual components 23, 33, 46, 58, and 64–66 via individual drivers 98, 99, 100, 101, 102, 103, and 104.

In this embodiment, the CPU 81 also serves as a counter. Although the glow plugs 46 and pressure sensors 47 are provided for the respective cylinders, only one plug and one pressure sensor are illustrated in FIG. 3.

Execution of fuel injection control by the ECU 71 will now be described with reference to FIGS. 4 to 11.

Figure 4:
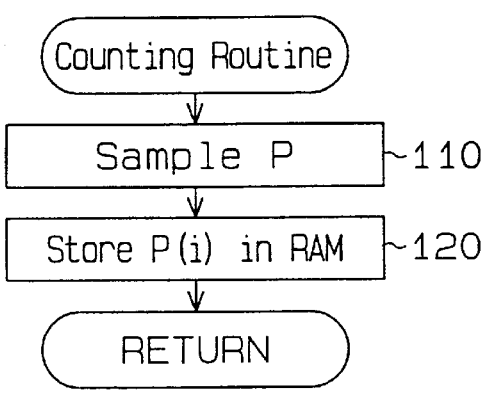

FIG. 4 presents the flowchart which illustrates the contents of a counting routine executed by the ECU 71. In this embodiment, the CPU 81 increments first count data i by "1" based on its counter function. In this embodiment i is a function of time. The ECU 71 executes this routine every time the data i is incremented. The data i here is incremented at a predetermined interval of "20 μs", "40 μs" or the like. For instance, the data i is temporarily reset and incremented every time pressured fuel is supplied to the injection nozzle 4 from the injection pump 1.

When the ECU 71 performs the counting routine, the ECU 71 samples the value of the fuel pressure P based on the signal from the pressure sensor 47 at step 110. At step 120, the ECU 71 sequentially stores the value of the currently sampled fuel pressure P in the RAM 83 as a fuel pressure P(i) corresponding to the value of the data i, and next, temporarily terminates the subsequent processing.

According to this routine, every time single fuel injection to the engine 2 is executed, the value of the fuel pressure P(i) corresponding to the data i then is sequentially stored in the RAM 83 as computation data.

FIGS. 8a–8c are graphs illustrating the change in fuel pressure over the period of a single fuel injection cycle, as well as its first derivative value (or first differential value) DP and second derivative value (or second differential value) DDP respectively. FIG. 8d is a graph of the change in fuel injection rate over the same period. As is apparent from the behaviors of the first and second derivative values, the value of the fuel pressure P varies according to a simple damped sinusoid. In particular, it is known that after the fuel injection is terminated, variations in the amplitude of the first and second derivative values DP and DDP gradually attenuate and converge to "0". Careful detection and attention to changing fuel pressure harmonics provides valuable insight into fuel characteristics such as fuel viscosity.

Figure 5:
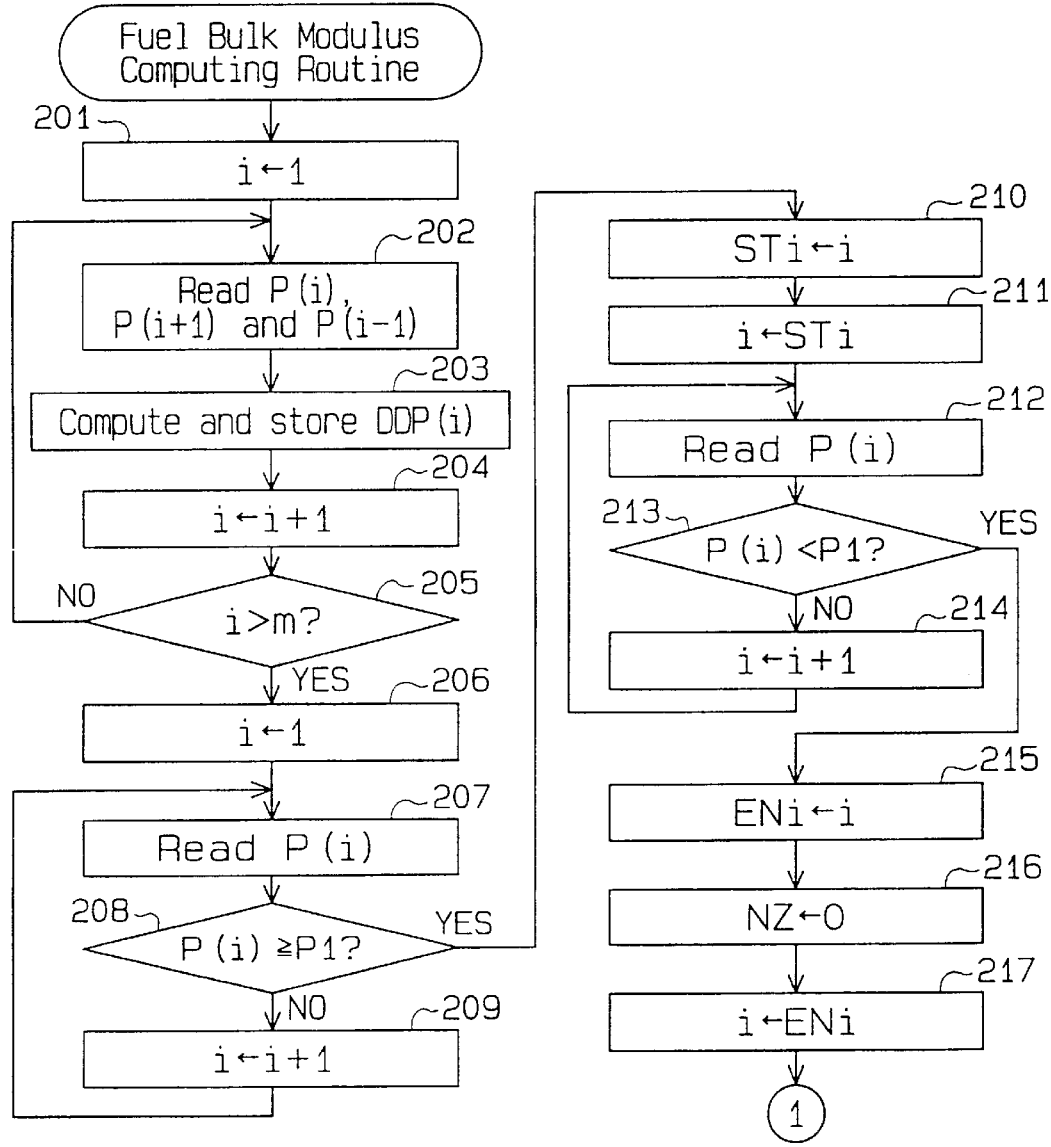
Figure 6:
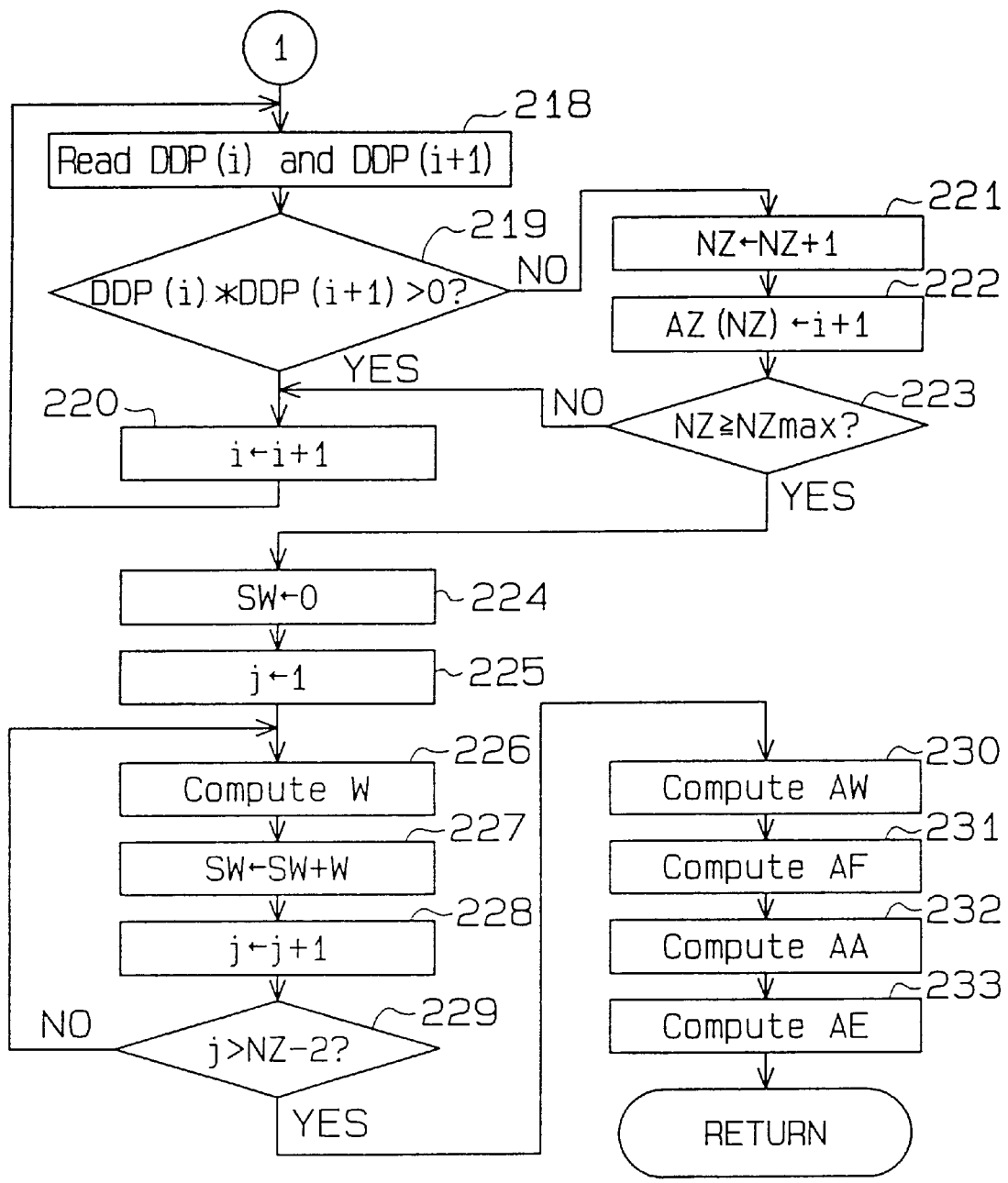

FIGS. 5 and 6 are flowcharts which illustrate the steps of a "fuel bulk modulus computing routine" executed by the ECU 71.

When the ECU 71 enters this routine, the ECU 71 at step 201 initializes count data i to "1". This data corresponds to the value of the fuel pressure P(i), stored in RAM 83 at the time of the previous fuel injection.

Subsequently, the ECU 71 reads, values for the fuel pressures P(i), P(i+1) and P(i−1) previously stored in RAM 83. Based on these values of P(i), P(i+1) and P(i−1), the ECU 71 computes a second derivative value DDP(i) and stores the result of the computation in the RAM 83 at step 203. The ECU 71 computes the second derivative value DDP(i) from the following equation (1):

$$DDP(i) = \{P(i+1) - P(i)\} - \{P(i) - P(i-1)\} \quad (1)$$

At the next step 204, the ECU 71 increments the data i by "1". The ECU 71 determines whether or not the currently incremented data i is greater than a predetermined maximum value m. This maximum value m corresponds to the number of total samplings with respect to the second derivative value DDP(i). When the data i is equal to or smaller than the maximum value m, the ECU 71 jumps to step 202 to repeat the sequence of processes at steps 202 to 205. When the data i is greater than the maximum value m, the ECU 71 proceeds to step 206.

The ECU 71 initializes the data i to "1" again at step 206, and reads the value of the fuel pressure P(i) corresponding to the data i then from the RAM 83 at step 207.

At step 208, the ECU 71 determines if the value of the currently read fuel pressure P(i) is equal to or greater than a predetermined reference value P1. This reference value P1 corresponds to the value of the pressure at which the injection nozzle 4 injects fuel to the engine's combustion chamber 44. When the value of the fuel pressure P(i) is smaller than the reference value P1, that is, when the fuel pressure P(i) has not yet increased to a value necessary to start fuel injection, the ECU 71 moves to step 209. After incrementing the data i by "1" at step 209, the ECU 71 returns to step 207 to execute the sequence of processes starting with this step 207 again. When the value of the fuel pressure P(i) is equal to or greater than the reference value P1, that is, when the fuel pressure P(i) is sufficient to allow fuel injection, the ECU 71 moves to step 210.

At step 210, the ECU 71 then sets data i as a rough prediction of the time STi to start fuel injection. At the subsequent step 211, the ECU 71 sets the time value STi as a reference value of the data i, and continues incrementing the subsequent data i.

At the next step 212, the ECU 71 reads the value of the fuel pressure P(i) corresponding to the data i after the rough injection start time STi, from the RAM 83. At step 213, the ECU 71 determines if the value of the currently read fuel pressure P(i) is equal to or smaller than the aforementioned reference value P1. When the value of the fuel pressure P(i) is equal to or greater than the reference value P1, that is, when the fuel pressure P(i) is still sufficient to continue fuel injection, the ECU 71 moves to step 214. After incrementing the data i by "1" at step 214, the ECU 71 jumps to step 212 again. When the value of the fuel pressure P(i) is smaller than the reference value P1, that is, when the fuel pressure P(i) has dropped sufficiently to the level to end fuel injection, the ECU 71 moves to step 215.

At step 215, the ECU 71 then sets the data i as the approximate predicted time for fuel injection to end, or injection end time ENi. Then, the ECU 71 resets the value of zero count data NZ (to be described later) to "0" at step 216. At the subsequent step 217, the ECU 71 sets the rough injection end time ENi as one reference time for the data i, and continues incrementing the subsequent data i.

At step 218, after determining the approximate injection end time ENi, the ECU 71 reads the value of a second derivative value DDP(i) and a second derivative value DDP(i+1) from the RAM 83.

Figure 9:
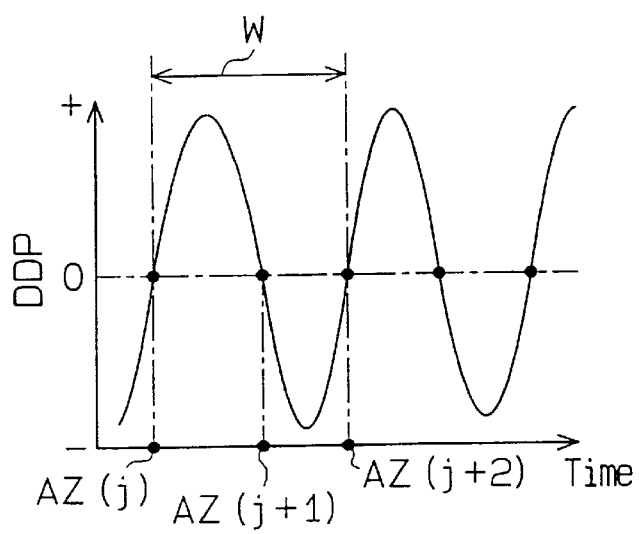

Next, the ECU 71 determines if the result of multiplying two second derivative values DDP(i) and DDP(i+1) is greater than "0" at step 219. This determination is possible given that the value of the second derivative value DDP fluctuates to the positive side and negative side around "0" as shown in FIG. 9. The ECU 71 determines if the value of the second derivative value DDP changes its polarity around "0". When the result of the multiplication is greater than "0", which means that the polarity of the second derivative value DDP(i) has not changed or that the second derivative value DDP(i) has not crossed "0", the ECU 71 proceeds to step 220. After incrementing the data i by "1" at step 220, the ECU 71 jumps to step 218 to execute the processing starting with this step 218 again. When the result of the multiplication is equal to or smaller than "0", which means that the polarity of the second derivative value DDP(i) has changed or that the second derivative value DDP(i) has crossed "0", the ECU 71 proceeds to step 221.

At step 221, the ECU 71 increments the value of the zero point count data NZ by "1". At the subsequent step 222, the ECU 71 sets the data i then plus "1" as the value of a zero point time AZ(NZ) corresponding to the value of the data NZ then.

The ECU 71 determines if the value of the data NZ is equal to or greater than a maximum value NZmax, e.g., "10 to 20" at step 223. When the value of the data NZ is smaller than the maximum value NZmax, the ECU 71 returns to step 220 to repeat the sequence of processes at steps 220 to 223. When the value of the data NZ is equal to or greater than the maximum value NZmax, the ECU 71 goes to step 224.

At step 224, the ECU 71 resets the accumulated value, SW, of the value of the oscillation periodic frequency (wavelength of time) W which will be discussed later, to "0". Further, the ECU 71 initializes second count data j indicating the timing at which the second derivative value DDP becomes "0" at step 225.

At step 226, the ECU 71 computes the value of the wavelength of time W. As shown in FIG. 9, this oscillation wavelength of time W is associated with the frequency of the second derivative value DDP. The ECU 71 computes the value of the oscillation wavelength W from the following equation (2):

$$W = AZ(j+2) - AZ(j) \tag{2}$$

As apparent from this equation (2), the period required for the frequency of the second derivative value DDP to cross the level of "0" twice in a row is obtained as the wavelength of time W based on the zero point time AZ(j) as shown in FIG. 9.

Subsequently, the ECU 71 adds the value of the currently obtained wavelength of time W to the value of the accumulated value SW and sets the resultant value as a new accumulated value SW at step 227. Further, the ECU 71 increments the data j by "1" at step 228.

At step 229, the ECU determines if the data j is greater than the value of the data NZ minus "2" or the number of times the wavelength of time W has been detected. If the value of the data j is equal to or smaller than the number of times the wavelength of time W has been detected, the ECU 71 returns to step 226 to repeat the sequence of processes at steps 226 to 229 to further continue the computation of the wavelength of time W, etc. If the value of the data j is larger than the number of times the wavelength of time W has been obtained, the ECU 71 proceeds to step 230 to stop the subsequent computation of the wavelength of time W, etc.

At step 230, the ECU 17 computes an average oscillation periodic frequency AW based on the accumulated value SW from the following equation (3):

$$AW = SW/(NZ-2) \tag{3}$$

According to this equation (3), the average wavelength of time AW is obtained by dividing the accumulated value SW by the number of times the wavelength of time W has been obtained.

At the next step 231, the ECU 17 computes the value of the frequency of fuel pressure, AF, based on the average wavelength of time AW from the following equation (4):

$$AF = 1/(AW \times \tau samp) \tag{4}$$

where τsam indicates the sampling period (time) for the fuel pressure P(i). According to this equation (4), the reciprocal of the multiplication of the average wavelength of time AW by the sampling period isamp is the value of the frequency of fuel pressure AF.

Then, at step 232, the ECU 71 computes a propagation speed AA based on the frequency of fuel pressure AF from the following equation (5):

$$AA = AF \times 2 \times L \tag{5}$$

where L indicates the length of the fuel line 4a. This equation (5) shows that the propagation speed AA is obtained by multiplying the frequency of fuel pressure AF by twice the length of the fuel line 4a.

At step 233, the ECU 71 computes the value of a bulk modulus AE based on the propagation speed AA from the following equation (6):

$$AE = (AA)^2 \times \rho \tag{6}$$

where ρ indicates a predetermined fuel density. This equation (6) shows that the bulk modulus AE is the product of the square of the propagation speed AA times the fuel density ρ.

The ECU 71 determines the bulk modulus AE in the above manner. The value of this bulk modulus AE is characteristic of the viscosity, among other properties, of the fuel contained in the fuel line 4a between the injection pump 1 and the injection nozzle 4 when fuel injection is executed.

Figure 7:
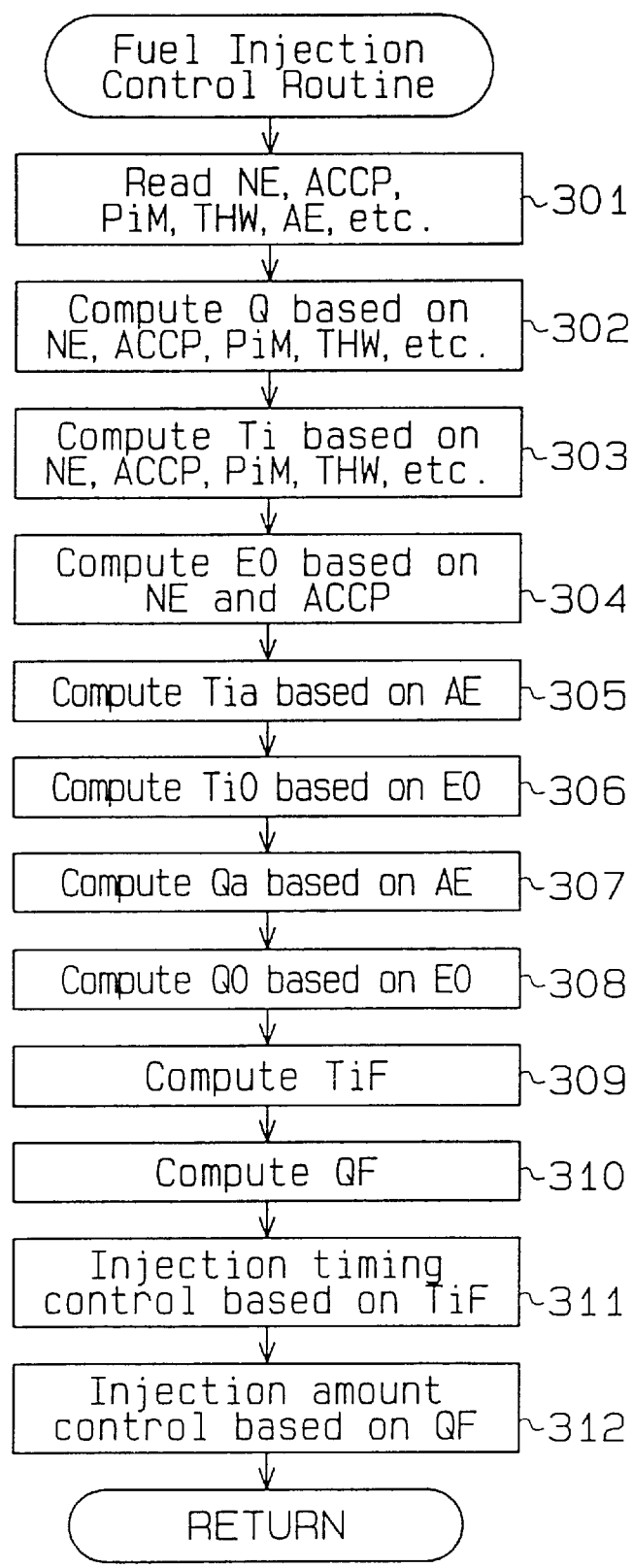
Figure 8:
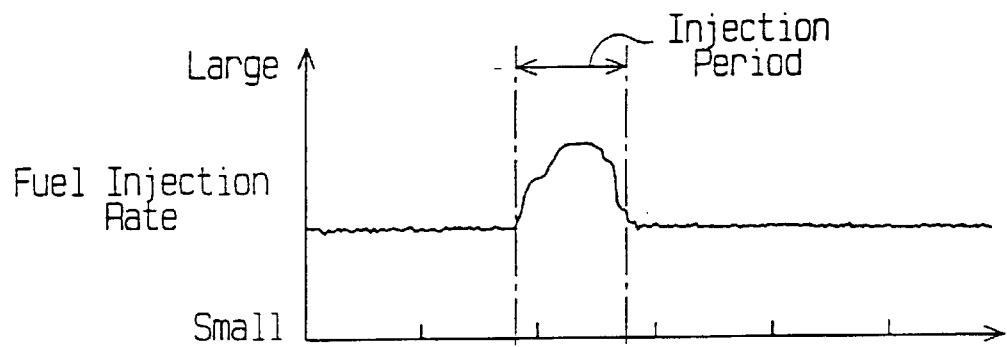
Figure 8:
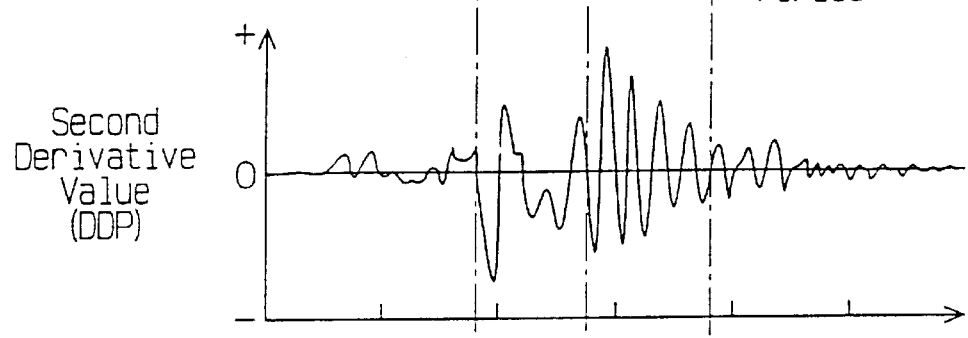
Figure 8:
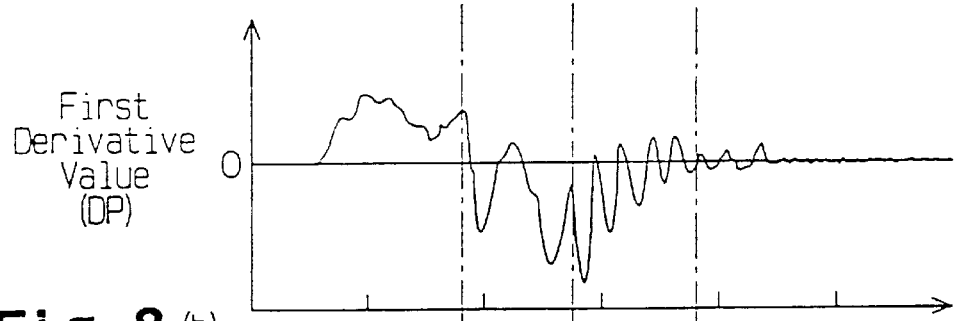
Figure 8:
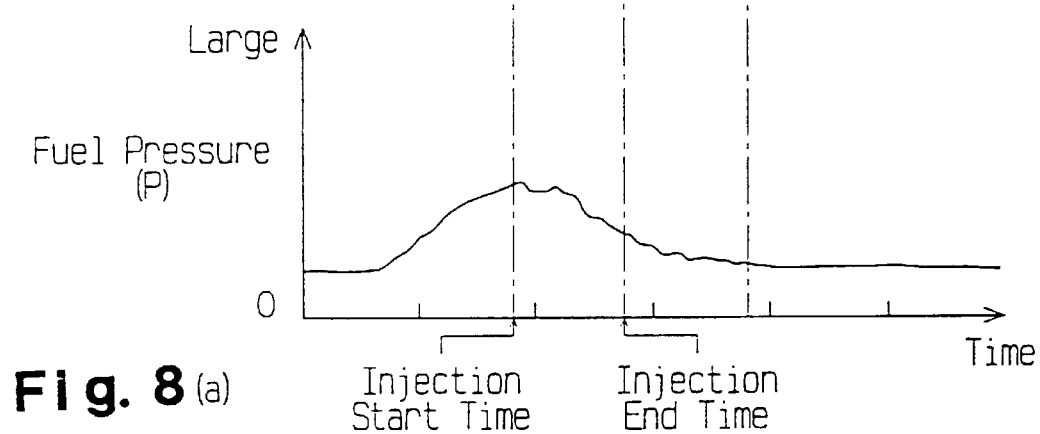

According to this embodiment, the ECU 71 executes the fuel injection control, which will be described later, using the calculated value bulk modulus AE. FIG. 7 presents the flowchart which illustrates the contents of a "fuel injection control routine" the ECU 71 periodically executes.

When the ECU 71 enters this routine, the ECU 71 reads values of the engine speed NE, acceleration pedal angle ACCP, boosted pressure PiM, coolant temperature THW, etc. based on various signals from the individual sensors 35, 73 to 75, etc. at step 301. In addition, the ECU 71 reads the value of the bulk modulus AE obtained in the above-described "fuel bulk modulus computing routine".

At the next step 302, the ECU 71 computes the value of a target injection amount Q according to the current driving condition from a predetermined equation based on the values of the currently read various parameters NE, ACCP, PiM, THW, etc. Since this equation is well known, its description will not be given here.

At step 303, the ECU 71 also computes the value of a target injection timing Ti according to the current driving condition from a predetermined equation based on the values of the currently read various parameters NE, ACCP, PiM, THW, etc. Since this equation is also of a well known type, its description will not be given here.

At step 304, the ECU 71 computes the value of a reference bulk modulus E0 from a predetermined equation based on the values of the currently read parameters NE and ACCP. The description of this equation will be omitted.

Figure 10:
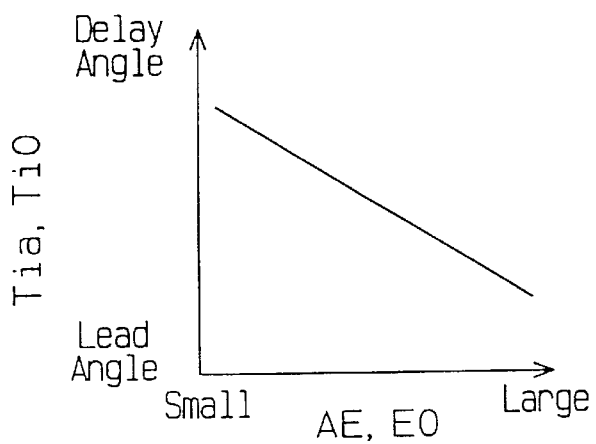

Based on the currently read bulk modulus AE, the ECU 71 computes the value of an actual injection start time Tia at step 305. Based on the currently read reference bulk modulus E0, the ECU 71 computes the value of a reference injection start time Ti0 at step 306. The ECU 71 obtains the values of both injection start times Tia and Ti0 by referring to a predetermined map as shown in FIG. 10. In this map, as the values of the bulk modulus AE and E0 increase, the injection start times Tia and Ti0 take values on the lead angle side.

Figure 11:
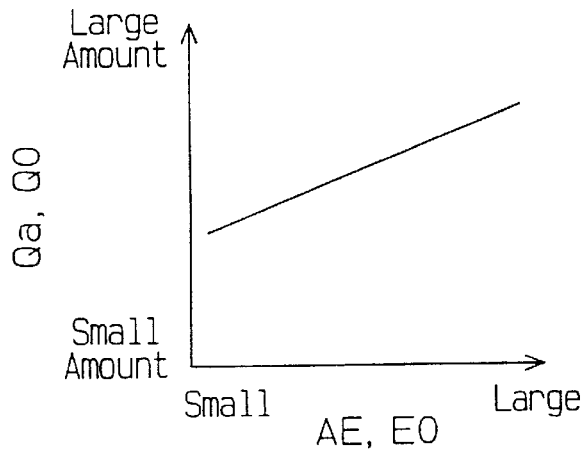

Based on the currently read bulk modulus AE, the ECU 71 computes the value of an actual injection amount Qa at step 307. At the next step 308, the ECU 71 computes the value of a reference injection amount Q0 based on the currently read reference bulk modulus E0. The ECU 71 obtains the values of both injection amounts Qa and Q0 by referring to a predetermined map as shown in FIG. 11. In this map, as the values of the bulk modulus AE and E0 increase, the injection amounts Qa and Q0 increase.

At step 309, the ECU 71 computes a final injection timing instruction value TiF from the following equation (7) based on the values of the currently obtained target injection timing Ti and injection start times Tia and Ti0.

$$TiF = Ti - (Tia - Ti0) \quad (7)$$

At step 310, the ECU 71 computes a final injection amount instruction value QF from the following equation (8) based on the values of the currently obtained target injection amount Q and injection amounts Qa and Q0.

$$QF = Q - (Qa - Q0) \quad (8)$$

At the next step 311, the ECU 71 executes injection timing control based on the currently obtained final injection timing instruction value TiF. More specifically, the ECU 71 controls the TCV 33 based on the injection timing instruction value TiF to control the timer apparatus 26. Accordingly, the timing for starting the supply of fuel under pressure to the injection nozzle 4 from the injection pump 1 is adjusted to control the timing for fuel injection from the injection nozzle 4.

Further, the ECU 71 executes fuel injection amount control based on the currently obtained final injection amount instruction value QF at step 312 and then temporarily terminates the subsequent processing. More specifically, the ECU 71 controls the electromagnetic spill valve 23 based on the injection amount instruction value QF to control the timing for ending the supply of fuel under pressure to the injection nozzle 4 from the injection pump 1. Accordingly, the amount of fuel injection from the injection nozzle 4 is controlled. The ECU 71 executes fuel injection control in the above manner.

According to the fuel injection control of this embodiment, as described above, at the time each injection nozzle 4 executes single fuel injection, the bulk modulus AE in the associated fuel line 4a between the injection pump 1 and the injection nozzle 4 is obtained. The injection amount instruction value QF and injection timing instruction value TiF are corrected based on the value of the bulk modulus AE. Based on the injection amount instruction value QF and injection timing instruction value TiF, the injection pump 1 controls the timing and fuel quantity used during fuel injection.

At the time of each fuel injection cycle, therefore, the amount of fuel fed under pressure from the injection pump 1 to each injection nozzle 4 is compensated based on a change in bulk modulus AE, caused by a variation in fuel characteristics such as fuel viscosity. Accordingly, the influence of the bulk modulus AE on the amount of fuel is eliminated. It is therefore possible to supply the proper amount of fuel under pressure from the injection pump 1 to the injection nozzle 4 and inject the fuel from the nozzle 4 at the proper time without being affected by variations in fuel property like fuel viscosity. As a result, high-precision fuel injection volume and timing control is possible. In this respect, it is possible to suppress the discharge of smoke or nitrogen oxides (NOx) from the engine 2.

According to this embodiment, at the beginning of a fuel injection cycle, the value of the fuel pressure P in each fuel line 4a is detected. Based on this detected value of the frequency of fuel pressure AF over a predetermined period immediately after fuel injection from the injection nozzle 4 is obtained. Based on the value of the frequency of fuel pressure AF, the bulk modulus AE is acquired.

It is known that immediately after fuel injection is completed, the period of the fluctuation of fuel pressure becomes stable, so that the frequency of fuel pressure AF becomes stable with less variation. Thus, the bulk modulus AE obtained based on the stable frequency of fuel pressure AF more properly reflects a variation in fuel property including variations in fuel viscosity. This allows for accurate analysis of variations in fuel property. Since the control apparatus disclosed in Japanese Unexamined Patent Publication 62-291453 determines the degree of the fuel viscosity based on a variation speed associated with the timer apparatus, its analysis can not preclude mechanical error associated with the timer apparatus. Fuel viscosity determinations according to this embodiment, however, may be performed without influence from mechanical error. Variations in fuel property can be detected at high precision with respect to the speed of the engine 2 and any load-oriented condition.

Accordingly, a change in fuel property such as fuel viscosity can be detected properly based on the bulk modulus AE. In accordance with the detection of the change, the injection timing instruction value TiF and injection amount instruction value QF can be obtained more accurately. In this respect too, the injection amount control and fuel injection timing control can be executed at high accuracy.

Second Embodiment

A second embodiment of the present invention as adapted for an electronic controlled diesel engine will now be described with reference to FIGS. 12 through 16. For individual embodiments including the second embodiment which will be discussed hereunder, like or same reference numerals will be used for components corresponding to or identical to those of the first embodiment and their detailed descriptions will be omitted.

In this embodiment, the ECU 71 obtains the value of the frequency of fuel pressure AF based on the value of the fuel pressure P immediately after the termination of fuel injection, and acquires the value of the bulk modulus AE based on that value, in accordance with the processes in the flowcharts in FIGS. 4 to 6, which have already been explained in the foregoing description of the first embodiment.

Figure 12:
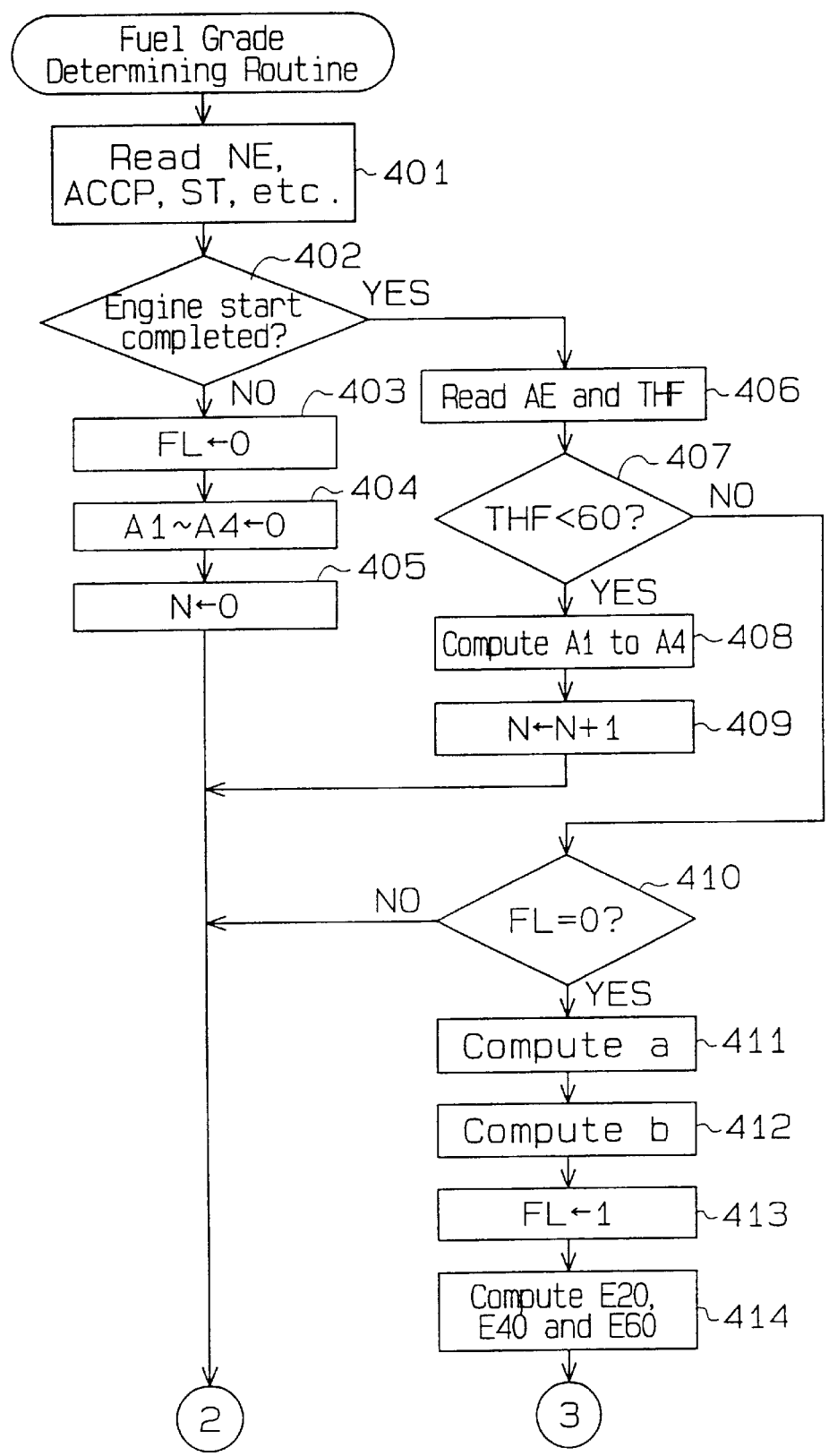
FIGS. 12 through 16 illustrate a second embodiment of the present invention as adapted also equipped with a booster.
Figure 13:
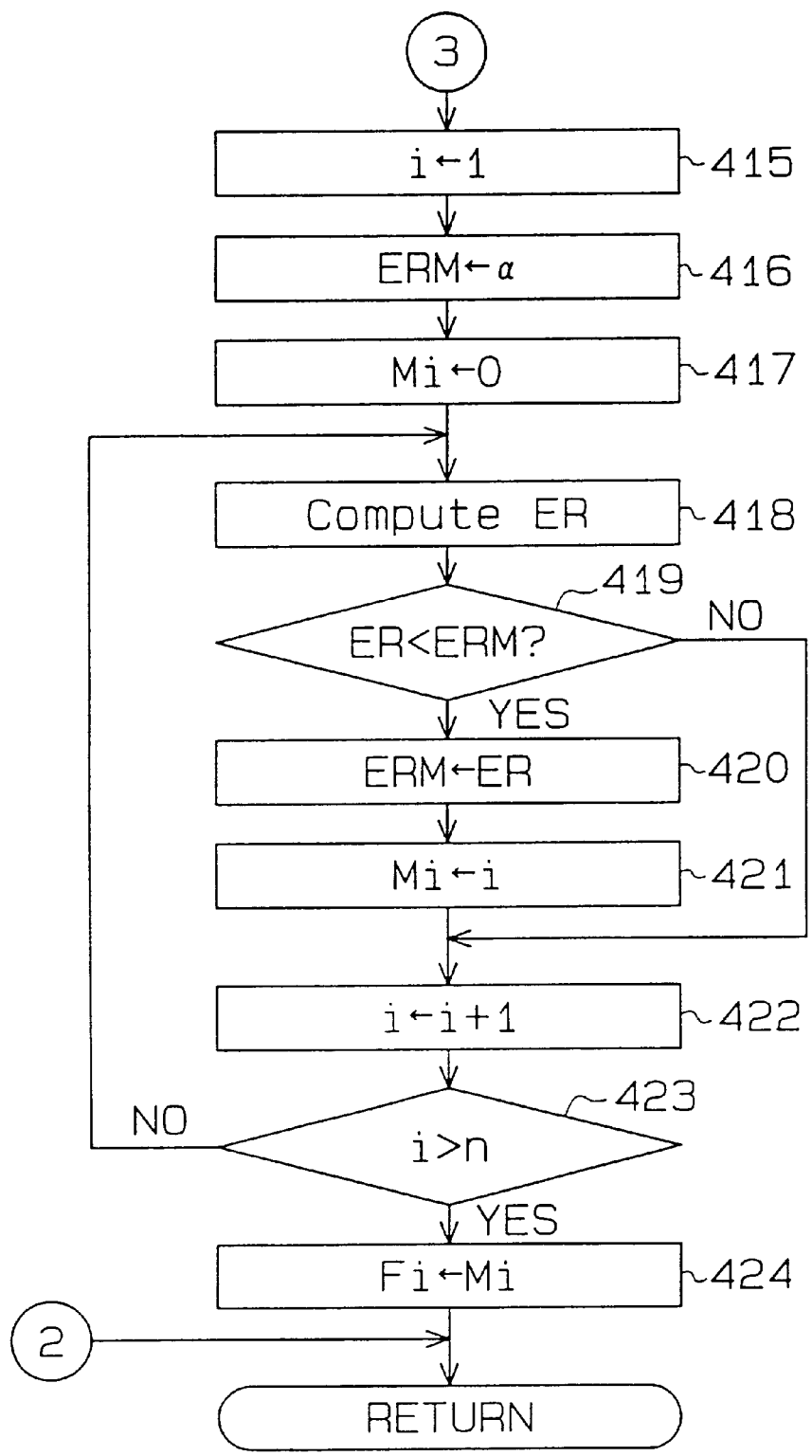
Figure 14:
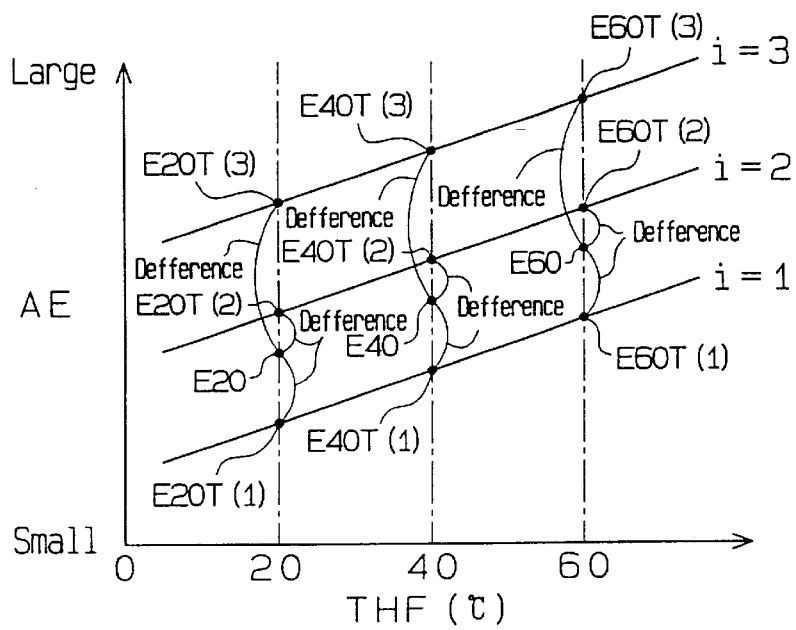

Using the obtained bulk modulus AE, the ECU 71 performs fuel injection control according to this embodiment as described below. FIGS. 12 and 13 each presents the flowchart which illustrates the contents of a "fuel grade determining routine" which the ECU 71 periodically executes in order to determine the grade of fuel to be used in the engine 2.

When the ECU 71 begins this routine at step 401, the ECU 71 reads the values of the engine speed NE, acceleration pedal angle ACCP and starter signal ST based on various signals from the engine speed sensor 35, acceleration pedal sensor 73, starter switch 69, etc.

At the next step 402, the ECU 71 determines if the engine 2 has been started, based on the currently read values of various parameters NE, ACCP and ST. If the engine 2 has not been started, the ECU 71 proceeds to step 403 to perform the processes at steps 403 to 405.

At step 403, the ECU 71 resets a control flag FL to zero. This flag indicates whether a coefficient a and Y-intercept b involved in linear equations which will be described later, is set to "0". Then, the ECU 71 resets a plurality of variables A1 to A4, discussed later, to "0" at step 404. The ECU 71 resets a set number N (to be described later) to "0" at step 405 and temporarily terminates the subsequent processing.

If engine starting operations are complete at step 402, the ECU 71 proceeds to step 406 where the ECU 71 reads the value of the bulk modulus AE, obtained in the above-described separate routine, and reads the value of the fuel temperature THF based on the signal from the fuel temperature sensor 37.

The ECU 71 determines if the value of the fuel temperature THF is lower than "60° C." at step 407. If the fuel temperature THF is lower than "60° C.", which means that the warm-up of the engine 2 is not complete, the ECU 71 proceeds to step 408. At step 408, the ECU 71 computes a plurality of variables A1 to A4 from the following equations (9) to (12). The ECU 71 uses those variables A1 to A4 to determine the coefficient a and Y-intercept b.

$$A1 = A1 + THF \times THF \quad (9)$$

$$A2 = A2 + THF \quad (10)$$

$$A3 = A3 + THF \times AE \quad (11)$$

$$A4 = A4 + AE \quad (12)$$

That is, the individual variables A1–A4 are determined on the basis of the periodic readings of fuel temperature THF and bulk modulus AE.

Next, the ECU 71 increments the set number N by "1" at step 409, and temporarily terminates subsequent processing. The set number N indicates how many times the variables A1–A4 has been computed. This step 409 determines the set number N indicating how many times the variables A1–A4 have been computed until engine warm-up is complete.

If the fuel temperature THF is equal to or higher than "60° C.", which means that the warm-up of the engine 2 has been completed, the ECU 71 proceeds to step 410. At step 410, the ECU 71 determines if the control flag FL is "0". When the control flag FL is not "0", which indicates that the coefficient a and Y-intercept b have already been acquired in this routine, the ECU 71 temporarily terminates the subsequent processing. When the control flag FL is "0", which indicates that the coefficient a and Y-intercept b have not been acquired yet in this routine, the ECU 71 moves to step 411.

At step 411, the ECU 71 computes the coefficient "a" from the following equation (13):

$$a = (N \times A3 - A2 \times A4)/(N \times A1 - A2 \times A2) \quad (13)$$

Subsequently, at step 412 the ECU 71 computes the Y-intercept b from the following equation (14).

$$b = (A3 - a \times A1)/A2 \quad (14)$$

When the coefficient a and Y-intercept b have been computed in the above manner, the ECU 71 sets the control flag FL to "1" at the next step 413.

Further, the ECU 71 computes the values of volume elasticities E20, E40 and E60 to be obtained for each value of the fuel temperature THF at step 414. The bulk modulus E20 indicates a bulk modulus when the fuel temperature THF is "20° C.", the bulk modulus E40 indicates a bulk modulus when the fuel temperature THF is "40° C.", and the bulk modulus E60 indicates a bulk modulus when the fuel temperature THF is "60° C.". The ECU 71 computes those volume elasticities E20, E40 and E60 from the following equations (15) to (17):

$$E20 = a \times 20 + b \quad (15)$$

$$E40 = a \times 40 + b \quad (16)$$

$$E60 = a \times 60 + b \quad (17)$$

That is, the values of the individual bulk modulus E20, E40 and E60 are determined based on the periodically determined coefficient a and Y-intercept b.

Then, the ECU 71 initializes a grade number i indicating the grade of fuel to "1" at step 415. At the next step 416, the ECU 71 sets the value of a minimum decision error ERM to a largest possible predetermined value a. Further, the ECU 71 resets a temporal grade number Mi for each fuel grade corresponding to the minimum decision error ER to "0" at step 417.

At the subsequent step 418, the ECU 71 computes the decision error ER associated with each fuel grade from the following equation (18):

$$ER = ABS(E20 - E20T(i)) + ABS(E40 - E40T(i)) + ABS(E60 - E60T(i)) \quad (18)$$

where E20T(i), E40T(i) and E60T(i) indicate a reference bulk modulus previously obtained for each fuel grade when the fuel temperature THF was "20° C.", "40° C." and "60° C.", respectively. The equation (18) shows that for each fuel grade, the decision error ER is obtained as the sum of the absolute values of the differences between the bulk modulus and the reference bulk modulus, i.e., between E20 and E20T(i), E40 and E40T(i), and E60 and E60T(i).

At step 419, the ECU 71 determines if the currently calculated decision error ER is smaller than the minimum decision error ERM. When the decision error ER is equal to or greater than the minimum decision error ERM, the ECU 71 proceeds to step 422. When the decision error ER is smaller than the minimum decision error ERM, on the other hand, the ECU 71 proceeds to step 420.

At step 420, the ECU 71 sets the currently acquired decision error ER as the minimum decision error ERM. Then, the ECU 71 sets the value i as a variable Mi for the fuel grade corresponding to that decision error ER as the temporal at step 421.

At step 422 as moved from step 419 or step 421, the ECU 71 increments the grade number i by "1". At the next step 423, the ECU 71 determines if the incremented grade number i is greater than a predetermined number n. When i is equal to or less than n, then the comparison of the decision error ER with the minimum decision error ERM has not been performed for all the fuel grades. When this occurs, the ECU 71 returns to step 418 to repeat the sequence of processes at steps 418 to 423. When the grade number i is larger than the predetermined number of grades n, then the comparison of the decision error ER with the minimum decision error ERM has been performed for all the fuel grades, and the ECU 71 proceeds to step 424.

At step 424, the ECU 71 sets the value of the variable Mi as a final determined number Fi corresponding to the fuel grade to be detected, and temporarily terminates the subsequent processing. That is, the ECU 71 computes the grade number i of the fuel grade which minimizes the decision error ER as the final determined number Fi.

In the above-described manner, the grade of fuel to be used in the fuel injection apparatus is periodically determined based on the values of the fuel temperature THF and the bulk modulus AE. Then, the value Fi corresponding to that fuel grade is determined.

Figure 15:
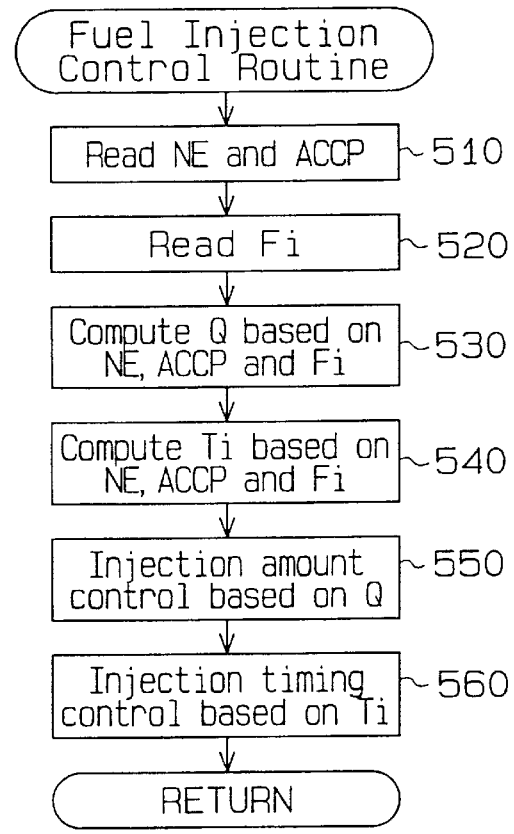

In this embodiment, the ECU 71 uses the value Fi, obtained in the above manner, to execute the fuel injection control. FIG. 15 presents the flowchart which illustrates the contents of a "fuel injection control routine" the ECU 71 periodically executes.

When the ECU 71 begins this routine, the ECU 71 reads values of the engine speed NE and acceleration pedal angle ACCP based on the signals from the engine speed sensor 35 and acceleration pedal sensor 73 at step 510.

At the next step 520, the ECU 71 reads the value of Fi for the fuel grade obtained in the "fuel grade determining routine".

Figure 16:
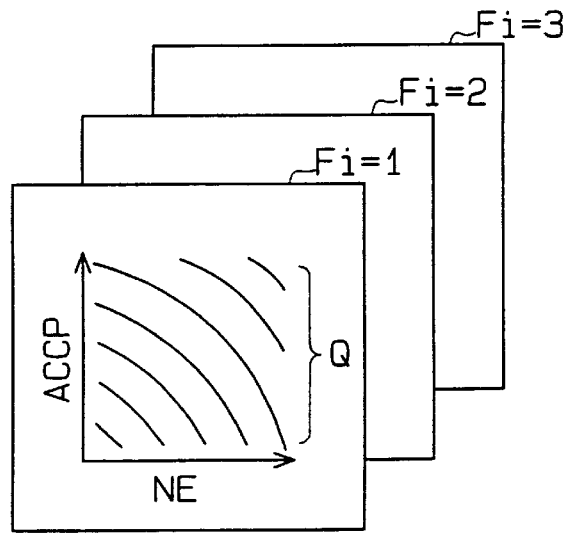

At step 530, the ECU 71 computes the value of a target injection amount Q based on the currently read values of the parameters NE, ACCP and Fi, referring to predetermined maps. In this embodiment, a plurality of predetermined maps for individual final determined numbers Fi as shown in FIG. 16 are stored in advance in the ROM 82. Those maps describe the relation among the engine speed NE, the acceleration pedal angle ACCP and the target injection amount Q for the individual fuel grades. Accordingly, the target injection amount Q is periodically determined under various engine operating conditions and for various fuel grades at step 530.

At step 540, the ECU 71 computes the value of a target injection timing Ti based on the currently read values of the parameters NE, ACCP and Fi. The ECU 71 acquires the target injection timing Ti by referring to maps as done at step 530. That is, the ECU 71 acquires the target injection timing Ti by referring to a plurality of predetermined maps in accordance with each value Fi. At this step 540, therefore, the target Ti according to the driving condition of the engine 2 is obtained in accordance with a variation in fuel grade.

The ECU 71 executes fuel injection amount control based on the currently acquired target injection amount Q at step 550. More specifically, the ECU 71 controls the electromagnetic spill valve 23 based on the target injection amount Q to control the timing for ending the supply of fuel under pressure to the injection nozzle 4 from the injection pump 1, thereby controlling the amount of fuel injection from the injection nozzle 4.

Further, the ECU 71 executes fuel injection timing control based on the currently obtained target injection timing Ti at step 560 and then temporarily terminates the subsequent processing. More specifically, the ECU 71 controls the TCV 33 based on the target injection timing Ti to control the timer apparatus 26. Accordingly, the timing for starting the supply of fuel under pressure to the injection nozzle 4 from the injection pump 1 is adjusted, thus controlling the timing for injecting fuel from the injection nozzle 4. The ECU 71 executes fuel injection control in the above manner.

According to the fuel injection control of this embodiment, as described above, at the time single fuel injection is performed, the value of the fuel pressure P in the fuel line 4a is detected by the pressure sensor 47. Based on the detected value, the frequency of fuel pressure AF is computed for the predetermined period immediately after fuel injection from the injection nozzle 4. Based on the value of the frequency of fuel pressure AF, the bulk modulus AE is acquired. Further, the occasional fuel temperature THF is detected by the fuel temperature sensor 37. Then, the fuel grade is determined based on the bulk modulus AE and fuel temperature THF. The target injection amount Q and the target injection timing Ti are obtained in accordance with the determined fuel grade. Based on those target injection amount Q and target injection timing Ti, the injection pump 1 is controlled to execute the fuel injection amount control and the fuel injection timing control.

According to this embodiment, therefore, every time fuel injection is performed, the amount of fuel fed under pressure from the injection pump 1 to each injection nozzle 4 is compensated based on a variation in fuel property including the fuel viscosity, caused by a variation in the grade of fuel to be used. The influence of fuel viscosity on the amount of fuel injected is eliminated. It is therefore possible to feed the proper amount of fuel under pressure from the injection pump 1 to the injection nozzle 4 and inject the fuel from the nozzle 4 regardless of a change in fuel grade. Likewise, fuel can be injected from the injection nozzle 4 at the proper injection start time. As a result, high-precision fuel injection amount control and fuel injection timing control can be executed.

According to this embodiment, as per the first embodiment, the value of the bulk modulus AE is obtained based on the stable frequency of fuel pressure AF immediately after fuel injection from the injection nozzle 4, and the fuel grade is determined based on the acquired value AE. According to this embodiment, as per the first embodiment, no mechanical errors are included in the controls and the fuel grade can be accurately determined with respect to the engine speed and any load-oriented condition. In this respect, the fuel injection amount control and fuel injection timing control can be executed at high accuracy, while more properly reflecting a change in the fuel property caused by a change in fuel grade.

Third Embodiment

A third embodiment of the present invention as adapted for an electronic controlled diesel engine will now be described with reference to FIGS. 17 through 19.

In this embodiment, the ECU 71 determines the change in a fuel pressure dP from the beginning of fuel supply under pressure from the injection pump 1 to the beginning of fuel injection from the injection nozzle 4, and obtains the bulk modulus AE based on the acquired value dP.

Figure 17:
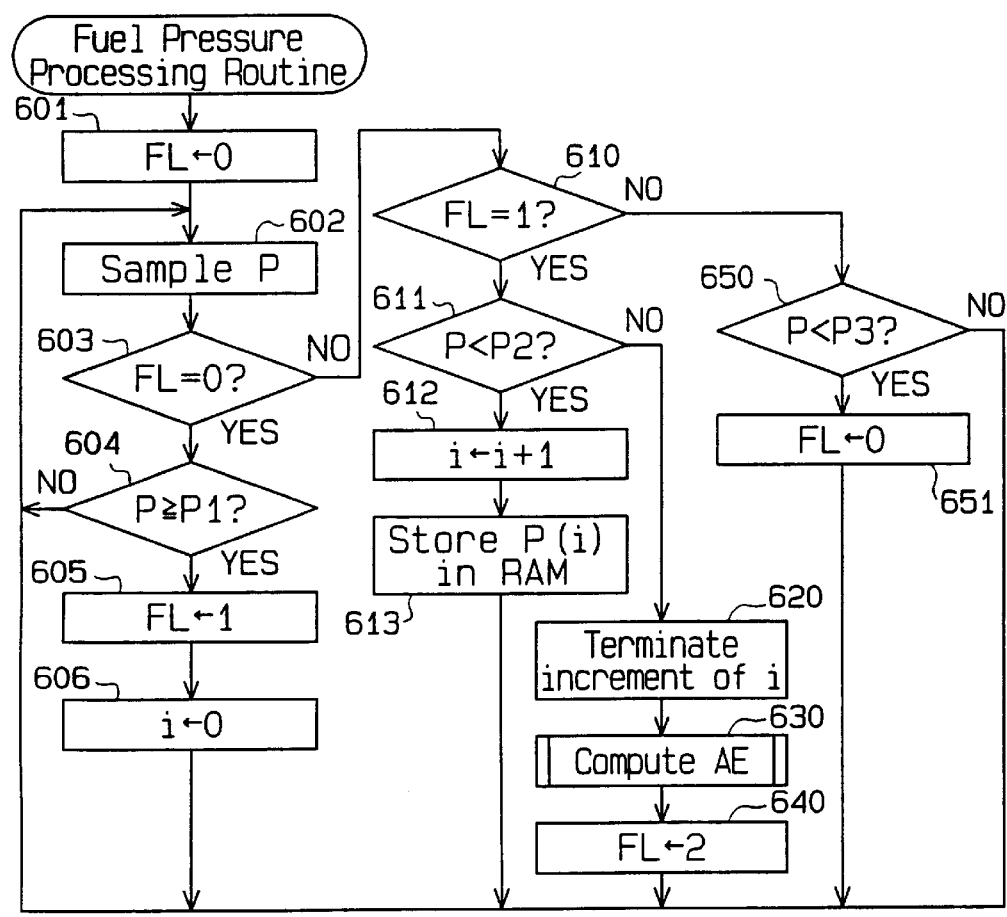
FIGS. 17 through 19 illustrate invention adapted for a diesel engine system equipped with a booster.

FIG. 17 presents the flowchart which illustrates the contents of a "fuel pressure processing routine" the ECU 71 periodically executes.

When the ECU 71 enters this routine, the ECU 71 resets the control flag FL for detecting the pressure to "0" at step 601. At the next step 602, the ECU 71 samples the value of the fuel pressure P based on the signal from the pressure sensor 47.

Then, the ECU 71 determines if the control flag FL is "0" at step 603. When the control flag FL is "0", the ECU 71 proceeds to step 604, otherwise the ECU 71 proceeds to step 610.

At step 604, the ECU 71 determines if the currently sampled value of the fuel pressure P is equal to or greater than a predetermined reference value P1 immediately after the supply of fuel under pressure from the injection pump 1 has started. When the value of the fuel pressure P is smaller than the predetermined reference value P1, the ECU 71 jumps to step 602 to repeat the sequence of processes at steps 602 to 604. When the value of the fuel pressure P is equal to or greater than the predetermined reference value P1, the ECU 71 moves to step 605 where the ECU 71 sets the control flag FL to "1". At step 606, the ECU 71 resets first count data i to "0" and jumps to step 602 to perform the sequence of processes starting with step 602.

After the performing the operations at step 603, the ECU 71 at step 610 determines if the control flag FL is "1". When the control flag FL is not "1", the ECU 71 proceeds to step 650. When the control flag FL is "1", the ECU 71 proceeds to step 611.

At step 611, the ECU 71 determines if the currently sampled value of the fuel pressure P is equal to or smaller than a predetermined reference value P2 immediately before the fuel fed under pressure from the injection pump 1 is injected from the injection nozzle 4. When the value of the fuel pressure P is greater than the predetermined reference value P2, the ECU 71 proceeds to step 620. When the value of the fuel pressure P is equal to or smaller than the predetermined reference value P2, the ECU 71 moves to step 612.

At step 612, the ECU 71 increments the data i by "1". Further, the ECU 71 stores the currently sampled value of the fuel pressure P in the RAM 83 as the value of the fuel pressure P(i) corresponding to the value of the current data i at step 613, and then returns to step 602 to execute the sequence of processes starting with the step 602.

At step 620 as moved from step 611, the ECU 71 terminates the increment of the data i and sets the current data i as a maximum value n.

At step 630, the ECU 71 computes the bulk modulus AE. The contents of this computation will be discussed below with reference to the flowchart of a "fuel bulk modulus computing routine" shown in FIG. 18.

First, the ECU 71 resets the accumulated value TdP of a fuel pressure change dP, which will be discussed later, to "0" at step 631. At step 632, the ECU 71 initializes the data i to "1".

At the next step 633, the ECU 71 computes the value of the fuel pressure change dP from the following equation (19) based on a plurality of fuel pressures P(i) to P(n) stored in the RAM 83.

$$dP=\{P(i+1)-P(i-1)\}/2 \tag{19}$$

Next, the ECU 71 adds the currently obtained value of the fuel pressure change dP to the previous accumulated value TdP to obtain a new accumulated value TdP.

The ECU 71 increments the data i by "1" at step 635 and determines if the value of the data i is greater than the maximum value n at step 636. When the value of the data i is equal to or smaller than the maximum value n, which means that the value of the fuel pressure change dP has not been acquired for every one of the fuel pressures P(i) to P(n), the ECU 71 jumps to step 633 to repeat the processes at steps 633 to 636. When the value of the data i is greater than the maximum value n, which means that the value of the fuel pressure change dP has been acquired for every one of the fuel pressures P(i) to P(n), the ECU 71 proceeds to step 637.

At this step 637, the ECU 71 computes the value of an average fuel pressure change AdP based on the accumulated value TdP from the following equation (20):

$$AdP=TdP/n \tag{20}$$

At the subsequent step 638, the ECU 71 computes the value of the bulk modulus AE based on the currently obtained average fuel pressure change AdP, etc. In general, the fuel pressure change dP which is obtained over a period from the beginning of the supply of fuel under pressure from the injection pump 1 to the beginning of fuel injection from the injection nozzle 4 is defined by a principle equation (21) given below.

$$dP=AE \times QP/V \tag{21}$$

where QP is the fuel transfer rate at the time fuel is fed under pressure from the injection pump 1, and V is the volume inside the fuel system between the injection pump 1 and the injection nozzle 4. QP and V are both design values previously obtained.

Setting the average fuel pressure change AdP to the fuel pressure change dP and rewriting the principle equation (21) for the bulk modulus AE, we obtain the following equation (22):

$$AE=AdP \times V/QP \tag{22}$$

After acquiring the bulk modulus AE at step 638 in this manner, the ECU 71 proceeds to step 640 in FIG. 17.

At step 640, the ECU 71 sets the control flag FL to "2" and returns to step 602 to execute the sequence of processes starting with this step 602.

At step 650 as moved from step 610, the ECU 71 determines if the currently sampled value of the fuel pressure P is smaller than a predetermined reference value P3 immediately after the fuel injection from the injection nozzle 4. When the value of the fuel pressure P is equal to or greater than the predetermined reference value P3, the ECU 71 directly jumps to step 602 to execute the sequence of processes starting with this step 602. When the value of the fuel pressure P is smaller than the predetermined reference value P3, the ECU 71 resets the control flag FL to "0" and returns to step 602 to execute the sequence of processes starting with this step 602.

The execution of the above-described "fuel pressure processing routine" will be described below with reference to the time chart shown in FIG. 19. This time chart shows the behavior of the fuel pressure P when single fuel injection is performed. It is apparent from this time chart that the average fuel pressure change AdP is obtained over a period from the beginning of the fuel supply to the injector under pressure to the beginning of the actual fuel injection. It is also apparent that the fuel pressure P takes a value between the reference value P1 and the reference value P2.

The value of this average fuel pressure change AdP is obtained as the actual measurement that reflects the time-dependent change in the fuel system including the injection pump 1 and the injection nozzles 4, the fuel property, and so forth every time fuel injection is performed. Based on the average fuel pressure change AdP, the ECU 71 calculates the bulk modulus AE that reflects the occasional time-dependent change in the fuel system, viscosity, and other fuel property characteristics.

According to this embodiment, the ECU 71 executes fuel injection control using the bulk modulus AE. In this embodiment, the ECU 71 also executes fuel injection control according to the same contents of the "fuel injection control routine" of the first embodiment shown in FIG. 7.

According to the fuel injection control of this embodiment, as described above, every time single fuel injection is performed, the value of the fuel pressure change dP in the fuel system between the injection pump 1 to the injection nozzles 4 is acquired based on the value of the fuel pressure P. Further, based on the average fuel pressure change AdP, the ECU 71 determines the bulk modulus AE and other fuel property characteristics. Based on the injection amount instruction value QF and injection timing instruction value TiF, which are corrected based on the bulk modulus AE, the ECU 71 controls the amount and timing of the fuel injected by the injection pump 1.

Accordingly, the third embodiment can act in the same way as the first embodiment and have the same advantages as those of the first embodiment.

Fourth Embodiment

A fourth embodiment of the present invention as adapted for an electronic controlled diesel engine will now be described.

Figure 18:
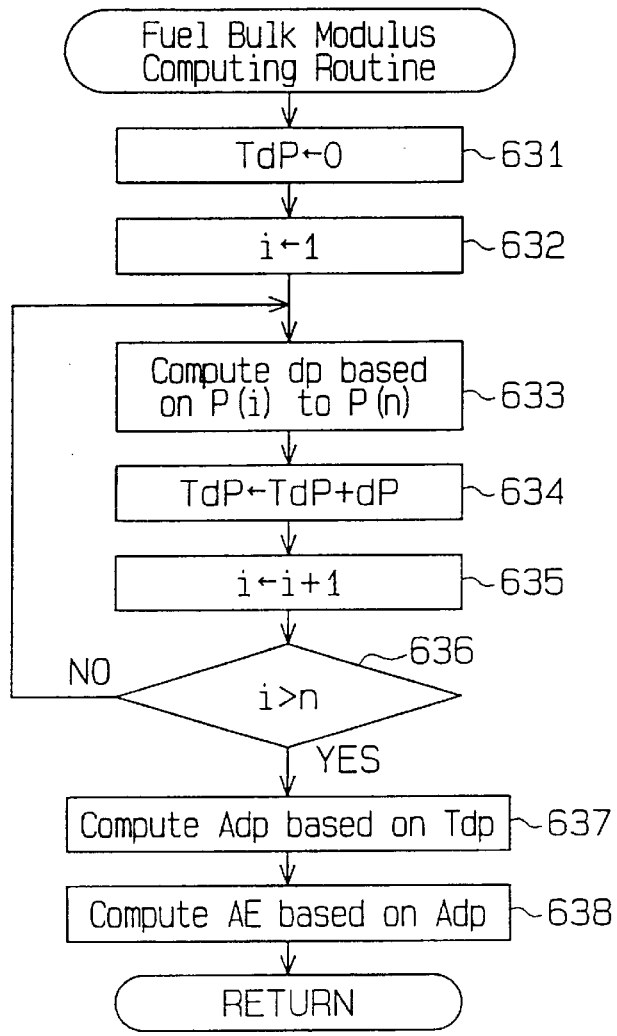
Figure 19:
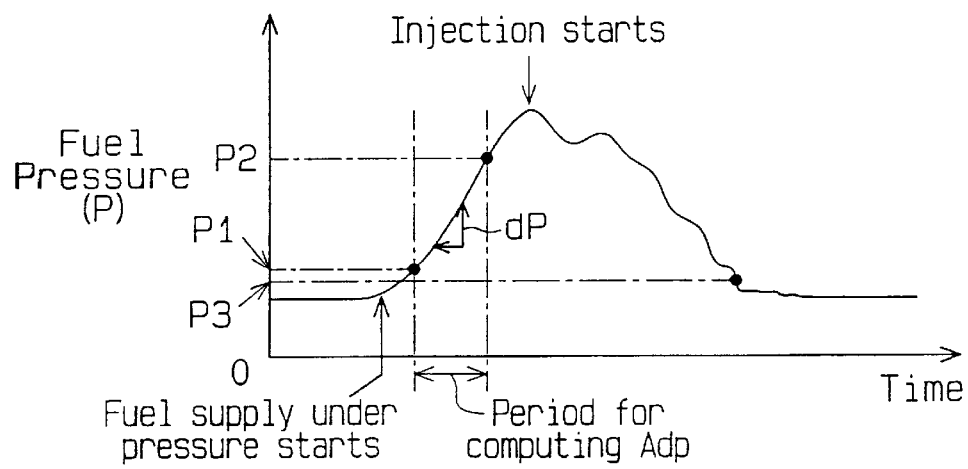

In this embodiment, the ECU 71 acquires a bulk modulus AE in accordance with the processing which is the same as the "fuel pressure processing routine" and "fuel bulk modulus computing routine" of the third embodiment respectively shown in FIGS. 17 and 18. Further, the ECU 71 determines the fuel grade based on the acquired bulk modulus AE and the fuel temperature THF detected by the fuel temperature sensor 37, in accordance with the processing which is the same as the "fuel grade determining routine" of the second embodiment shown in FIGS. 12 and 13. Based on the determined fuel grade, the ECU 71 executes fuel injection control in accordance with the processing which is the same as the "fuel injection control routine" of the second embodiment shown in FIG. 15.

According to the fuel injection control of this embodiment, therefore, every time single fuel injection is performed, a change in fuel pressure dP is obtained based on the value of the fuel pressure P in the fuel system. Based on this fuel pressure change dP, the bulk modulus AE, which reflects a pressure change in the fuel system with the passage of time, the difference in fuel property, etc., is obtained. Further, the fuel grade is determined based on the bulk modulus AE and the fuel temperature THF, Based on the target injection amount Q and target injection timing Ti, which are corrected according to the difference in the fuel grade, the injection pump 1 is controlled to execute the fuel injection amount control and fuel injection timing control.

Accordingly, the fourth embodiment can act in the same way as the third embodiment and have the same advantages as those of the third embodiment.

Fifth Embodiment

A fifth embodiment of the present invention as adapted for an electronic controlled diesel engine will now be described with reference to FIGS. 20 to 22.

In this embodiment, the ECU 71 executes the fuel injection control in accordance with the processing described below, based on the value of the fuel pressure P for a predetermined period of time immediately after the fuel fed under pressure from the injection pump 1 has been injected from the injection nozzle 4.

Figure 20:
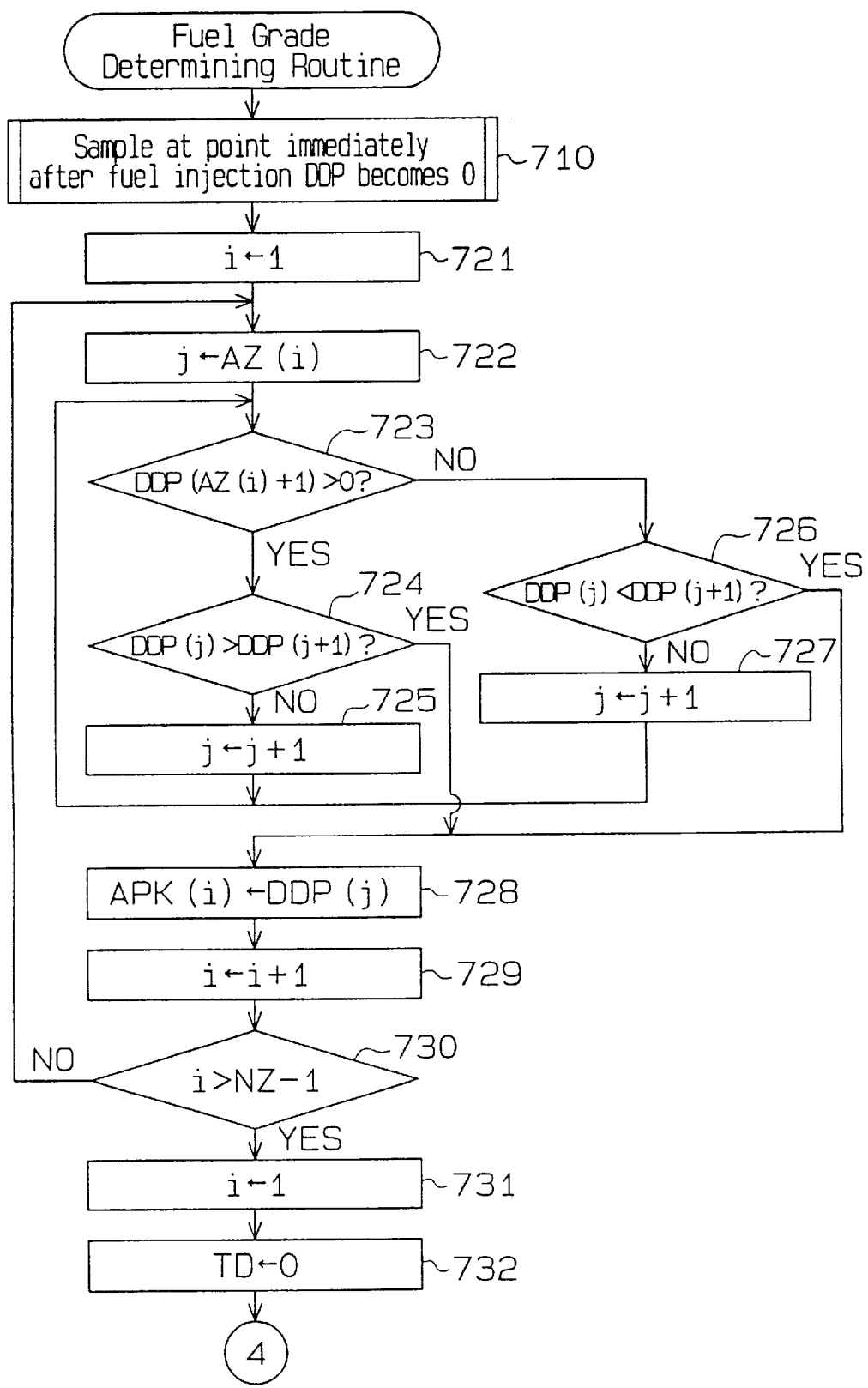
FIGS. 20 through 22 illustrate a 4th embodiment of the present invention as adapted for a diesel engine system equipped with a booster.
Figure 21:
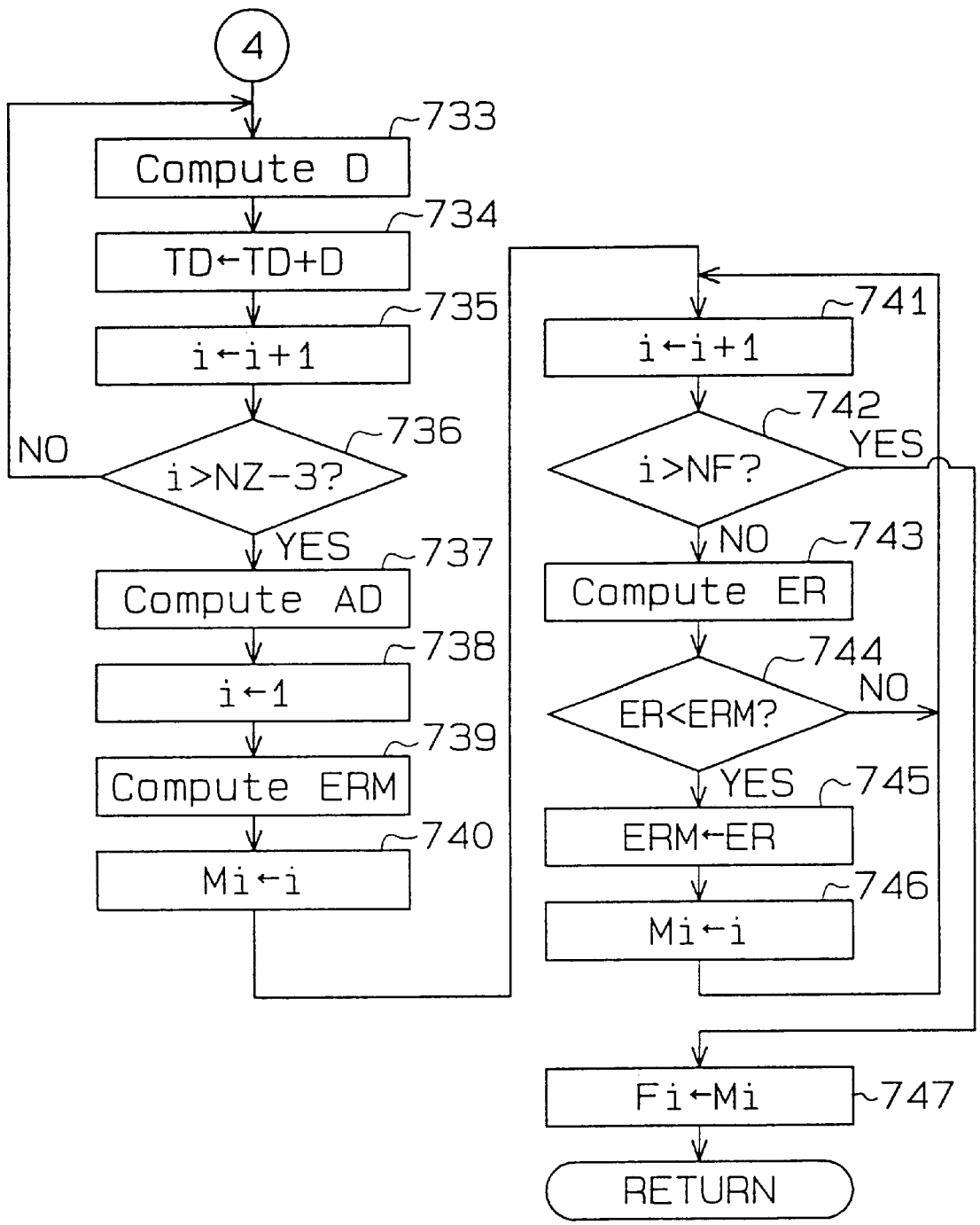

FIGS. 20 and 21 present the flowchart which illustrates the contents of processing of a "fuel grade determining routine" the ECU 71 executes periodically.

When the ECU 71 enters this routine at step 710 immediately after the injection of fuel from the injection nozzle 4, it performs sampling of the second derivative values DDP at a time when value DDP equals zero. Since the process at this step 710 is the same as the processes at steps 201 to 223 in the flowchart in FIGS. 5 and 6, which has already been explained in the section of the first embodiment, its detailed description will not be given here.

At step 721 after step 710, the ECU 71 initializes data i at the point where the second derivative value DDP is "0". At the next step 722, the ECU 71 treats a zero point time AZ(i), set for the data i, as the first reference value of second count data j which indicates the timing at which the second derivative value DDP reaches a maximum, and increments only the subsequent data j.

Next, the ECU 71 determines at step 723 whether or not the second derivative value DDP(Az(i)+1) at a first sampling point following the zero point time AZ(i) is greater than "0". That is, the ECU 71 determines the polarity of the second derivative value DDP after the second derivative value DDP has become "0" on the premise that the second derivative value DDP fluctuates while changing its polarity around "0" as shown in FIG. 22. When the second derivative value DDP(j) changes to a negative value, the ECU 71 proceeds to step 726. When the second derivative value DDP(j) changes to a positive value, on the other hand, the ECU 71 proceeds to step 724.

At step 724, the ECU 71 determines if the second derivative value DDP(j) corresponding to the value of the data j then is greater than a second derivative value DDP(j+1) immediately following the former value DDP(j). When the second derivative value DDP(j) is equal to or less than the second derivative value DDP(j+1), which means that the second derivative value DDP(j) has not reached the positive peak, the ECU 71 proceeds to step 725. The ECU 71 increments the data j by "1" at step 725 and then returns to step 723 to execute the sequence of processes starting with this step 723. When the second derivative value DDP(j) is greater than the next second derivative value DDP(j+1) at step 724, which means that the second derivative value DDP(j) has reached the positive peak, the ECU 71 proceeds to step 728.

At step 726 moved from step 723, the ECU 71 determines whether the second derivative value DDP(j) corresponding to the value of the data j then is smaller than the second derivative value DDP(j+1) immediately following the former value DDP(j). When the second derivative value DDP(j) is equal to or greater than the second derivative value DDP(j+1), it means that the second derivative value DDP(j) has not reached a minimum, and the ECU 71 proceeds to step 727. The ECU 71 increments the data j by "1" at step 727 and then returns to step 723 to execute the sequence of processes starting with this step 723. When the second derivative value DDP(j) is smaller than the second derivative value DDP(j+1) at step 726, it means that the second derivative value DDP(j) has reached the minimum, and the ECU 71 proceeds to step 728.

At step 728 moved from step 724 or step 726, the ECU 71 sets the second derivative value DDP which has reached the peak value as a peak value APK(i) corresponding to the first count data i.

At the subsequent step 729, the ECU 71 increments the data i by "1". Next, the ECU 17 determines at step 730 if the value of the data i is greater than the value of the zero point count data NZ minus "1". When the value of the data i is not greater than NZ −1, the ECU 71 jumps to step 722 to repeat the processes at steps 722 to 730 in order to continue the detection of the peak value of the second derivative value DDP(j). When the value of the data i is greater than NZ −1, the ECU 71 proceeds to step 731 to terminate the detection of the peak value of the second derivative value DDP(j).

At step 731, the ECU 71 initializes the data i to "1". Then, the ECU 71 resets the accumulated value, TD to "0" at step 732. Value TD is derived from damping ratio D and relates to the vibration of the fuel pressure, which will be described later.

In the next step 733, the ECU 71 computes the damping ratio D relating to the vibration of the fuel pressure. As shown in FIG. 22, it is known that the frequency of the second derivative value DDP gradually attenuates its amplitude after fuel injection. The ECU 71 computes the degree of the attenuation of the amplitude as the damping ratio D from the following equation (23):

$$D=ABS(APK(i+2)-APK(i+1)/ABS(APK(i+1)-APK(i)) \qquad (23)$$

Figure 22:
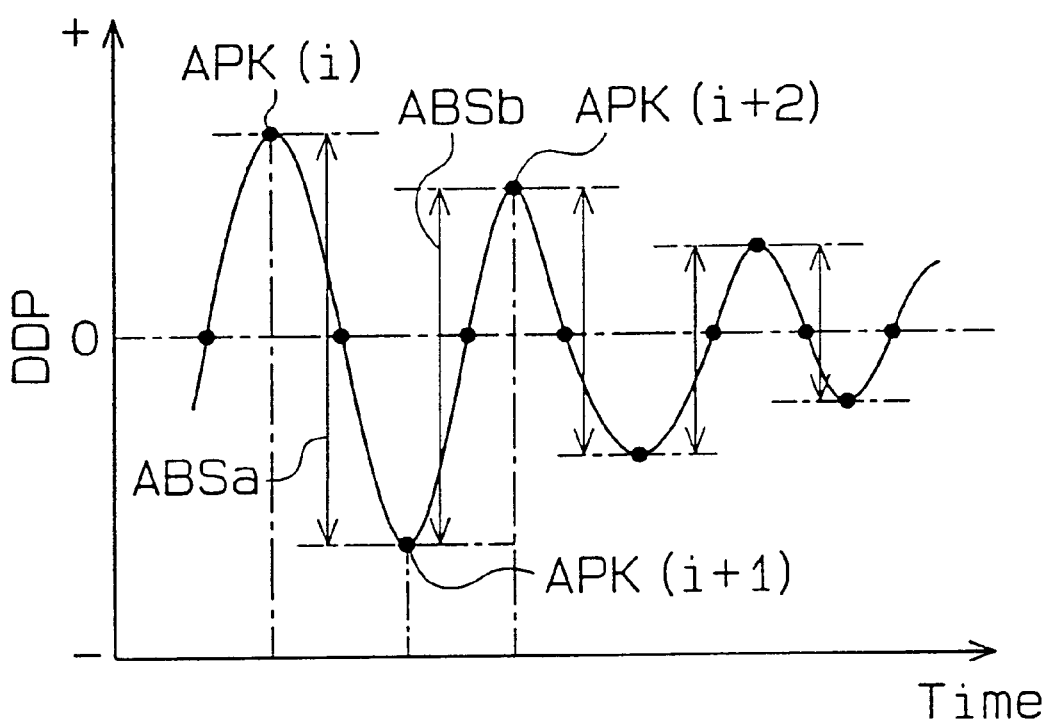

As shown in FIG. 22, taking a peak value APK(i) at one point as a reference value, the ECU 71 acquires the absolute value, ABSa, of the difference between that peak value APK(i) and a first peak value APK(i+1) after APK(i). Further, the ECU 71 acquires the absolute value, ABSb, of the difference between the peak value APK(i+1) and a second peak value APK(i+2) after APK(i). Then, the ECU 71 obtains the ratio of one absolute value ABSa to the other absolute value ABSb as the damping ratio D.

At the next step 734, the ECU 71 adds the currently obtained damping ratio D to the previous accumulated value TD to acquire a new accumulated value TD. Then, the EdU 71 increments the data i by "1" at step 735.

At step 736, the ECU 71 determines if the value of the data i is greater than the value of the data NZ minus "3".When the value of the data i is not greater than NZ −3, the ECU 71 jumps to step 733 to repeat the processes at steps 733 to 736 in order to continue the computation of the damping ratio D. When the value of the data i is greater than NZ −3, the ECU 71 proceeds to step 737 to terminate the computation of the damping ratio D.

At step 737, the ECU 71 computes an average damping ratio AD from the following equation (24) based on the accumulated value TD of the damping ratio D.

$$AD=TD/(NZ-3) \qquad (24)$$

Here the value of (NZ −3) indicates the number of times the damping ratio D has been obtained.

At step 739, the ECU 71 initializes the data i to "1" at step 738, and then computes the minimum decision error ERM from the following equation (25):

$$ERM=ABS(DMAP(i)-AD) \qquad (25)$$

Here DMAP(i) is a reference damping ratio preliminarily obtained for each grade of fuel that is expected to be used, and is stored in advance in the ROM 82. At this step 739, the absolute value of the difference between the reference damping ratio DMAP(i) and the acquired average damping ratio AD as the minimum decision error ERM.

At step 740, the ECU 71 sets the value of the data i then as a temporal grade number Mi. Then, the ECU 71 increments the data i by "1" at step 741.

At step 742, the ECU 71 determines if the value of the data i is greater than a total number of grades NF. When the value of the data i is not greater than the total grade number NF, the ECU 71 proceeds to step 743 to compute the decision error ER from the following equation (26):

$$ER=ABS(DMAP(i)-AD) \qquad (26)$$

At step 744, the ECU 71 determines if the currently obtained decision error ER is smaller than the minimum decision error ERM. When the current decision error ER is not smaller than the minimum decision error ERM, the ECU 71 returns to step 741 to execute the sequence of processes starting with this step 741. When the decision error ER is smaller than the minimum decision error ERM, on the other hand, the ECU 71 proceeds to step 745 to set the current decision error ER as the minimum decision error ERM. After setting the value of the current data i as the variable Mi at step 746, the ECU 71 returns to step 741 to execute the sequence of processes starting with this step 741.

When the value of the data i is greater than the total grade number NF at step 742, the ECU 71 sets the value of the variable Mi as a final determined number Fi corresponding to the fuel grade to be obtained at step 747, and temporarily terminates the subsequent processing. That is, the value of the data i associated with the fuel grade which minimizes the decision error ER is obtained as the value Fi.

It is apparent from FIG. 22 that the second derivative value DDP is a damped sinusoid. The reduction of the fuel pressure frequency occurs due to the frictional resistance at the time the viscous fuel contacts the inner wall of the fuel line 4a. Therefore, the damping of the fuel pressure frequency is proportional to the fuel viscosity then, and this fuel viscosity differs from one fuel grade to another. In this embodiment, therefore, the ECU 71 determines the fuel grade which reflects the difference in the fuel property including the fuel viscosity.

In this embodiment, the ECU 71 executes the fuel injection control according to the same processing as the "fuel injection control routine" of the second embodiment shown in FIG. 15, using the value of the final determined number Fi that is obtained in the above manner.

According to the fuel injection control of this embodiment, therefore, every time single fuel injection is performed, the average damping ratio AD associated with the fuel pressure frequency of the fuel is obtained based on the value of the fuel pressure P in the fuel line 4a. Further, the fuel grade is determined based on the average damping ratio AD and the target injection amount Q. Target injection timing Ti are obtained in accordance with the determined fuel grade. Based on the target injection amount Q and target injection timing Ti, the injection pump 1 controls the amount of fuel injection and the fuel injection timing.

Accordingly, this embodiment can act in the same way as the second embodiment and have the same advantages as those of the second embodiment.

Sixth Embodiment

A sixth embodiment of the present invention as adapted for an electronically controlled diesel engine will now be described with reference to FIGS. 23 to 25.

In this embodiment, the ECU 71 performs fuel injection control, based on the fuel pressure P detected after fuel, under pressure from the injection pump 1, has been injected from the injection nozzle 4.

Figure 23:
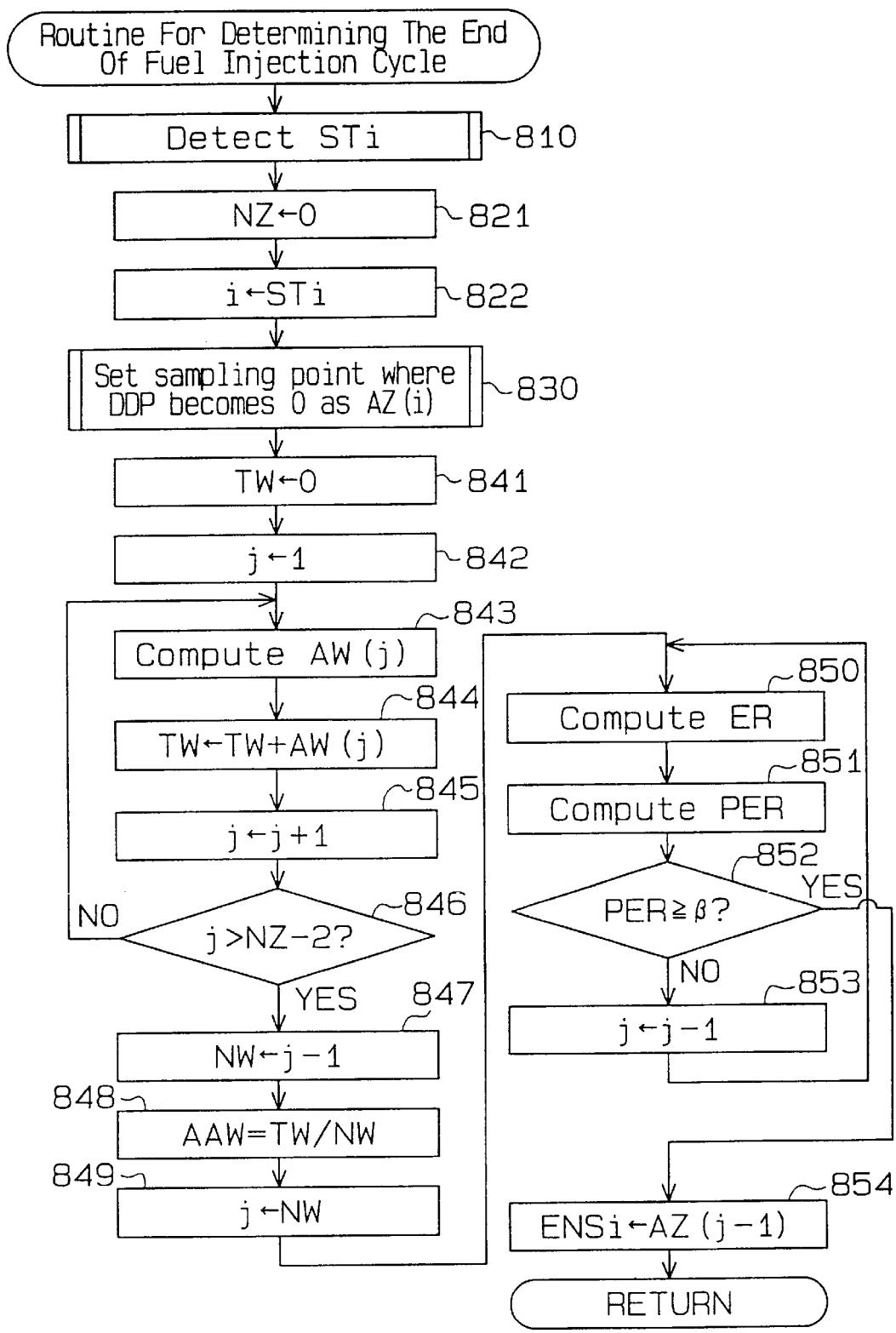
FIGS. 23 through 25 illustrate a 5th embodiment of the present invention adapted for a diesel engine system equipped with a booster.

FIG. 23 presents the flowchart which illustrate the contents of processing of a "fuel injection end time detecting routine" which the ECU 71 periodically executes.

When the ECU 71 enters this routine, it detects injection start time STi at step 810. Since the process at this step 810 is the same as the processes at steps 201 to 210 in the flowchart in FIG. 5, explained in the first embodiment, its detailed description will not be given here.

At step 821 after step 810, the ECU 71 resets the zero point count data NZ to "0". At the next step 822, the ECU 71 continues to increment only the subsequent data i, using the injection start time STi as a reference for the first count data i.

At the subsequent step 830, the ECU 71 sets the sampling point at which the second derivative value DDP of the fuel pressure P becomes "0" as the zero point time AZ(i). As the process at this step 830 is the same as the processes at steps 218 to 223 in the flowchart in FIG. 6, its detailed description here will not be given.

Following the processing a step 830, the ECU 71 at step 841 resets the accumulated value, TW, of the wavelength of time W which will be discussed later. At the next step 842, the ECU 71 initializes the second count data j to "1".

Then, at step 843, the ECU 71 computes the wavelength of time AW(j) of the frequency of the second derivative value DDP in each period from the following equation (27):

$$AW(j)=AZ(j+2)-AZ(j) \quad (27)$$

Figure 24:
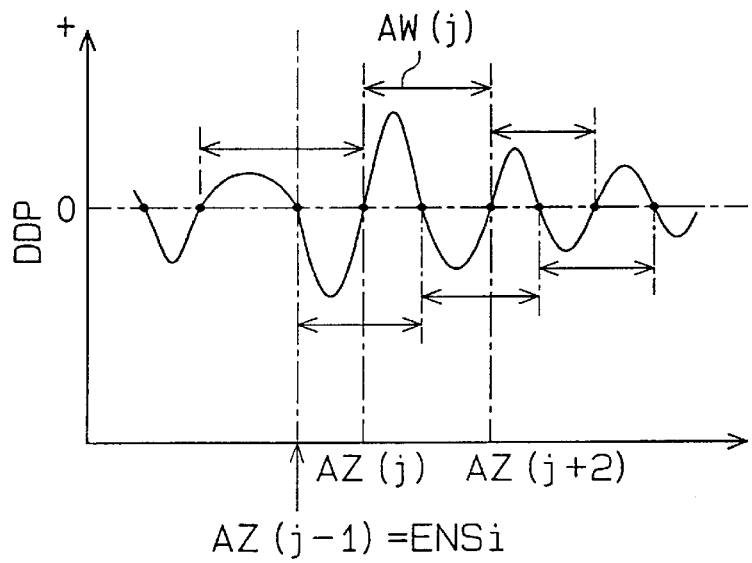
Figure 25:
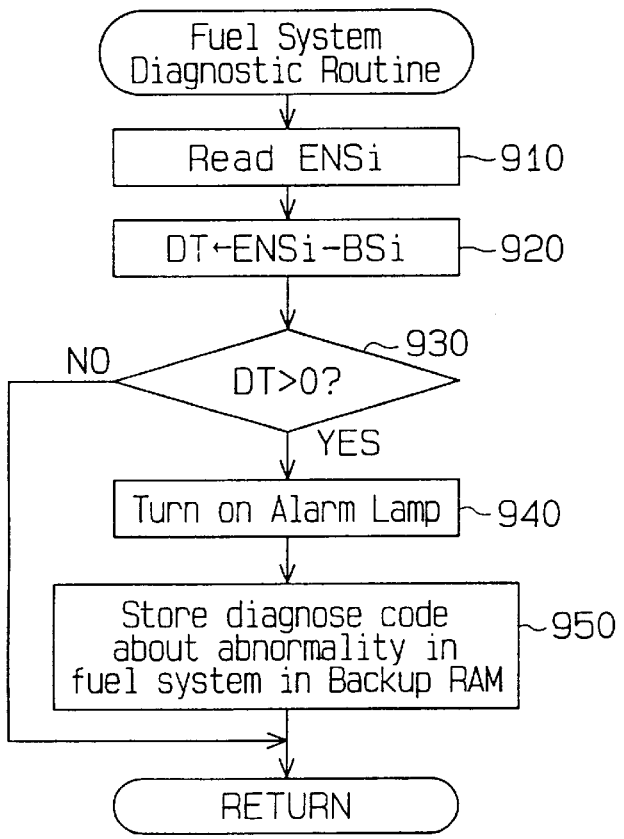
Figure 27:
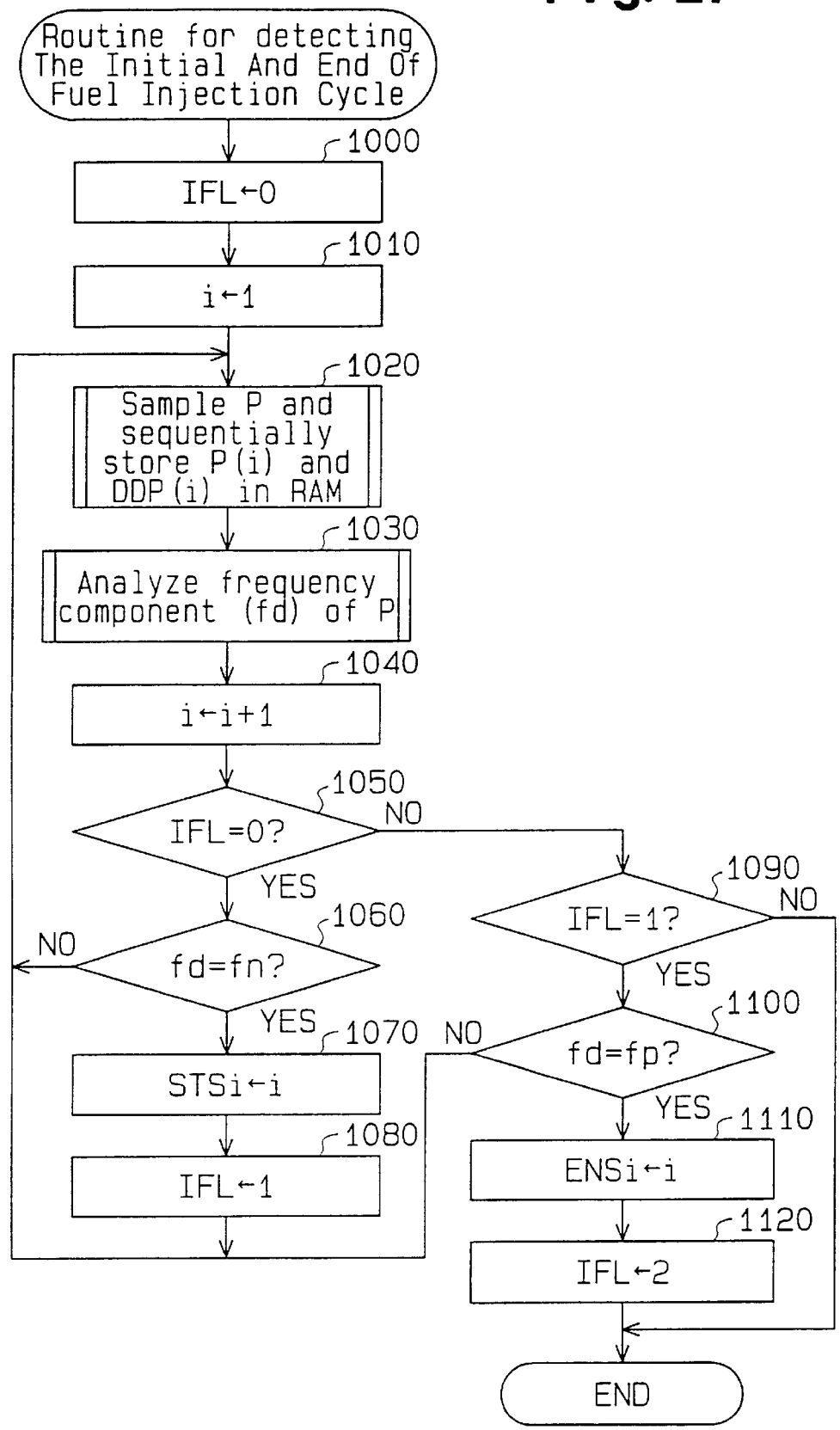

In other words, the ECU 71 acquires the time difference between one zero point time AZ(j) and the second zero point time AZ(j+2) after AZ(j) is obtained as the wavelength of time AW(j), as shown in FIG. 24.

At step 844, the ECU 71 adds the value of the currently obtained wavelength of time AW(j) to the previous accumulated value TW to compute a new accumulated value TW. Next, the ECU 71 increments the data j showing "0" by "1" at step 845.

At the next step 846, the ECU 71 determines if the data j is greater than the value of the data NZ minus "2", i.e., if the data j is greater than the number of times the wavelength of time AW(j) has been obtained. When the data j is not greater than the number of times the wavelength of time AW(j) has been obtained, the ECU 71 returns to step 843 to repeat the sequence of processes at steps 843 to 846 in order to continue the computation of the wavelength of time Aw(j), etc. When the data j is greater than the number of times the wavelength of time AW(j) has been obtained, on the other hand, the ECU 71 proceeds to step 847 to terminate the computation of the wavelength of time AW(j), etc.

At step 847, the ECU 71 sets the data j minus "1" as a periodic frequency number (wavelength number) NW. Next, the ECU 71 divides the accumulated value TW of the wavelength of time AW(j) by the wavelength number NW to compute an average wavelength of time AAW at step 848. At the next step 849, the ECU 71 sets the wavelength number NW then as a reference value for the data j.

Then, the ECU 71 computes the decision error ER from the following equation (28) at step 850.

$$ER=AW(j)-AAW \quad (28)$$

That is, the ECU 71 acquires the difference between the wavelength of time AW(j) and the average wavelength of time AAW as the decision error ER.

Subsequently, at step 851, the ECU 71 computes the decision error ratio PER from the following equation (29):

$$PER=ABS(ER)/AAW \quad (29)$$

That is, the ECU 71 acquires the ratio of the absolute value of the decision error ER to the average wavelength of time AWW as the decision error ratio PER.

At the next step 852, the ECU 71 determines if the currently obtained decision error ratio PER is equal to or greater than a reference value $\beta$. When the currently obtained decision error ratio PER is smaller than the reference value $\beta$, the ECU 71 proceeds to step 853 to continue the computation of the decision error ratio PER, etc. The ECU 71 increments the data j by "1" at step 853, and then returns to step 850 to repeat the sequence of processes at steps 850 to 852. In other words, when the decision error ratio PER is smaller than the reference value $\beta$, the ECU 71 returns to step 850 to obtain the decision error ratio PER that corresponds to the value of the data j incremented by one.

When the decision error ratio PER is equal to or greater than the reference value $\beta$ at step 852, it indicates that the difference or deviation of the associated wavelength of time AW(j) from the average wavelength of time AAW is large. The ECU 71, at that point, proceeds to step 854 to terminate the computation of the decision error ratio PER. At step 854, the ECU 71 decrements the zero point time AZ(j) by one, i.e., AZ(j-1) to calculate injection end time ENSi corresponding to the wavelength of time AW(j) having the large deviation, as an injection end time ENSi, and temporarily terminates the subsequent processing.

In other words, the ECU 71 sets the zero point time AZ(j-1), when the disturbance of the wavelength of time AW(j) becomes larger, in order to defect the injection end time ENSi, as shown in FIG. 24.

In this embodiment, using the injection end time ENSi obtained in the above manner, the ECU 71 executes a process of diagnosing an abnormality in the fuel system, which will be discussed below. FIG. 25 presents the flowchart which illustrate the contents of a "fuel system diagnosing routine" which the ECU 71 periodically executes.

When the ECU 71 enters this routine, it reads the value of the injection end time ENSi, detected in the above-described routine, at step 910. At the next step 920, the ECU 71 sets the difference between the injection end time ENSi and a predetermined reference time BSi as a delay time DT of the injection end time ENSi. The reference time BSi indicates the latest time allowable as the injection end time ENSi.

At step 930, the ECU 71 determines if the value of the currently obtained delay time DT is greater than "0". When the value of the delay time DT is not greater than "0", which means that no abnormality has occurred in the fuel system, the ECU 71 temporarily terminates the subsequent processing. When the value of the delay time DT is greater than "0", which means that an abnormality has occurred in the fuel system, the ECU 71 proceeds to step 940. As a possible example of the abnormality in the fuel system, the valve body 25 of the electromagnetic spill valve 23 may stick in the injection pump 1 for some reason, and delay the closing of the electromagnetic spill valve 23.

At this step 940, the ECU 71 turns on the alarm lamp 66 to inform the driver of an abnormality in the fuel system. Then at step 950, the ECU 71 generates and stores a diagnostic code of the fuel system abnormality in the backup Ram 84 which indicates that an abnormality has occurred in the fuel system, and temporarily terminates the subsequent process. The ECU 71 diagnoses an abnormality in the fuel system in this manner.

According to the fuel injection control of this embodiment, as described above, at the time the fuel is injected from the injection nozzle 4, the value of the fuel pressure P in the fuel line 4a is detected. Further, the frequency of the fuel pressure is detected based on the second derivative value DDP of the fuel pressure P as is the value of the average wavelength of time AAW of the fluctuating pressure. When the difference between each wavelength of time AW(j) and the average periodic frequency AAW becomes large, the vicinity of the time at which the difference increases is determined as the injection end time ENSi. That is, the time at which the disturbance of each wavelength of time AW(j) shifts to the wavelength of time of nearly a constant period is detected as the injection end time ENSi.

It should be noted that the time when the disturbance of the wavelength of time AW(j) of the frequency of the fuel pressure changes to the wavelength of time of nearly a constant period at the time of fuel injection corresponds to the time at which the injection nozzle 4 is closed at the time of terminating the fuel injection. Accordingly, the injection end time ENSi is specifically based on frequency in the fuel pressure. Fuel injection end time ENSi is properly determined regardless of the difference in the property of the fuel in the fuel system. It is therefore possible to always acquire the fuel injection end time ENSi accurately. In particular, the injection end time ENSi can be obtained accurately with respect to the rotational speed and load of the engine 2.

In addition, since the alarm lamp 66 is lit when an abnormality in the injection pump 1 or the like is diagnosed based on the obtained injection end time ENSi in this embodiment, the driver can be informed of the abnormality in the fuel system in real time. Further, because the diagnostic code with respect to the abnormality in the fuel system is stored in the backup RAM 84, it is possible to check whether or not there is an abnormality in the fuel system by reading the data from the backup RAM 84 at the time of the regular inspection of the engine 2.

Seventh Embodiment

A seventh embodiment of the present invention as adapted for an electronically controlled diesel engine will now be described with reference to FIGS. 26 to 29.

In this embodiment, the ECU 71 performs fuel injection control, based on the fuel pressure P detected at the time the fuel, fed under pressure from the injection pump 1, has been injected from the injection nozzle 4.

The ECU 71 analyzes a frequency component fd of the behavior of the fuel pressure P at the time of single fuel injection, and detects the injection start time STSi and the injection end time ENSi from the result of the analysis. Based on the detected injection start time STSi and injection end time ENSi, the ECU 71 executes fuel injection control.

FIG. 26 presents a time chart illustrating a change in fuel injection rate obtained at the time of single fuel injection, and the behaviors of the fuel pressure P according to this change, its first derivative value DP and second derivative value DDP. As is apparent from this time chart, the behaviors of the fuel pressure P, its first derivative value DP and its second derivative value DDP in the period before fuel injection has started, those during fuel injection and those in the period after the end of the fuel injection differ from one another. This is because the factors responsible for the variation of the fuel pressure P in the individual periods differ from one another. In the period before the start of fuel injection, the fuel pressure P varies mainly due to a change in the rotation of the fuel feed pump 6. During fuel injection, the fuel pressure P varies mainly due to the vibration specific to the needle valve in the injection nozzle 4. In the period after the end of fuel injection, the fuel pressure P varies mainly due to the columnar vibration in the fuel line 4a.

According to this embodiment, therefore, the injection start time STSi and the injection end time ENSi are calculated by detecting changes in the behavior of the fuel pressure P or the frequency component fd. Accordingly, the frequency of the needle valve vibration and the frequency of the columnar vibration fp in the fuel line 4a are stored in advance in the ROM 82 of the ECU 71. The values of those frequencies fn and fp are what were experimentally obtained in advance for this diesel engine.

The following describes the detailed contents of the detection of the injection start time and the injection end time. The flowchart illustrated in FIG. 27 describes a "routine for detecting the start and end of the fuel injection cycle". This routine is executed by the ECU 71 every time an engine cylinder to be discriminated reaches the bottom dead center (BDC) in the suction stroke.

At the beginning of this routine at step 1000, the ECU 71 resets a control flag IFL (to be described later), which indicates whether or not the injection start time STSi and injection end time ENSi have already been detected.

At the next step 1010, the ECU 71 initializes the first count data i to "1". The data i here is incremented at an interval of "20 $\mu$s", "40 $\mu$s" or the like.

At the next step 1020, the ECU 71 samples the value of the fuel pressure P based on the signal from the pressure sensor 47. The ECU 71 sequentially stores the value of the currently sampled fuel pressure P as a fuel pressure P(i) corresponding to the value of the data i stored in the RAM 83. Further, the ECU 71 computes a second derivative value DDP(i) corresponding to the value of the fuel pressure P(i), and sequentially stores the computation result in the RAM 83 in association with the value of the data i. The values of the fuel pressure P(i) and its second derivative value DDP(i) are sequentially stored in the RAM 83 for use in later computations.

At the subsequent step 1030, the ECU 71 analyzes the frequency component fd of the fuel pressure P(i) and second derivative value DDP(i), based on stored values for the fuel pressure P(i) and second derivative value DDP(i), as described in earlier embodiments. As the analyzing method, this embodiment uses the well-known fast Fourier transform (FFT) using the second derivative value DDP(i) for sampling data. The description of this FFT will not be given here.

At the subsequent step 1040, the ECU 71 increments the data i by "1". The ECU 71 determines if the control flag IFL is "0" at step 1050. When the control flag IFL is "0", which means that the injection start time STSi or injection end time ENSi has not been detected yet, the ECU 71 proceeds to step 1060 to execute the sequence of processes at steps 1060 to 1080.

At step 1060 moved from step 1050, the ECU 71 determines if the value of the currently analyzed frequency component fd matches the value of the frequency of the specific vibration fn previously stored in the ROM 82. If the values of fd and fn do not match, it indicates that fuel injection has not started yet, and the ECU 71 returns to step 1020 to repeat the sequence of processes at steps 1020 to 1060. If both values fd and fn match, it indicates that fuel injection has started, and the ECU 71 proceeds to step 1070.

At step 1070, the ECU 71 sets the value of the currently incremented data i as the injection start time STSi. Then, the ECU 71 sets the control flag IFL to "1" at step 1080 to indicate that the injection start time STSi has been detected. Then, the ECU 71 returns to step 1020 from step 1080 to execute the sequence of processes starting with step 1020.

When the control flag IFL is not "0" at step 1050, i.e., when the injection start time STSi or injection end time ENSi has been detected, the ECU 71 proceeds to step 1090 to execute the sequence of processes at steps 1090 to 1120.

At step 1090 moved from step 1050, the ECU 71 determines if the control flag IFL is "1". When the control flag IFL is not "1", the ECU 71 temporarily terminates the subsequent processing. When the control flag IFL is "1", on the other hand, i.e., when the injection start time STSi has already been detected, the ECU 71 moves to step 1100.

At step 1100, the ECU 71 determines if the value of the currently analyzed frequency component fd matches the frequency of the columnar vibration fp previously stored in the ROM 82. If both values fd and fp do not match, it means that fuel injection has begun but has not yet ended. Under these circumstances the ECU 71 returns to execute the processes at step 1020. Should both of the values for fd and fp match this indicates, that fuel injection has ended, and the ECU 71 proceeds to step 1110.

At step 1110, the ECU 71 sets the value of the currently incremented data i as the injection end time ENSi to be detected. Further, the ECU 71 sets the control flag IFL to "2" at step 1120 to indicate that the injection start time STSi has been detected, and then temporarily terminates the subsequent processing.

The ECU 71 detects the fuel injection start time STSi and fuel injection end time ENSi in the above manner.

According to this embodiment, the ECU 71 executes the process of diagnosing an abnormality in the fuel system using the acquired injection end time ENSi. In this embodiment too, the ECU 71 performs fuel system abnormality detection using the same routines as described in "fuel system diagnosing routine" of the sixth embodiment, illustrated in FIG. 25.

Figure 28:
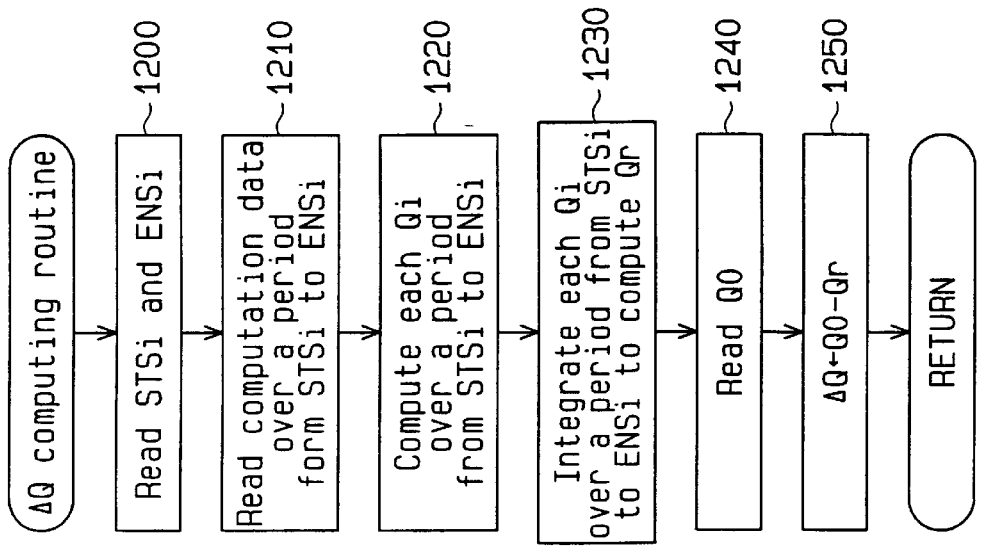

In addition, the ECU 71 implements the following control routine using the acquired injection start time STSi and injection end time ENSi. FIG. 28 presents the flowchart which illustrates the contents of a "ΔQ computing routine" which the ECU 71 periodically executes to compute an injection amount difference ΔQ used in the fuel injection amount control.

When the ECU 71 enters this routine, it reads the values of the aforementioned injection start time STSi and injection end time ENSi at step 1200.

At the next step 1210, the ECU 71 reads computation data corresponding to each data i in a period from the injection start time STSi to the injection end time ENSi. That is, the ECU 71 reads the fuel pressure P(i) and its second derivative value DDP(i) corresponding to the value of each data i.

At the subsequent step 1220, the ECU 71 computes the value of a fuel injection amount Qi at the timing of each data i (hereinafter referred to as "instant injection amount) based on the value of each fuel pressure P(i), during the period from the injection start time STSi to the injection end time ENSi. The ECU 71 computes the value of this instant injection amount Qi from the following equation (30).

$$Qi = KL \times \sqrt{Pi} \tag{30}$$

where KL is a predetermined lift constant used in ascertaining the amount of the lift of the needle valve of the injection nozzle 4.

At step 1230, the ECU 71 integrates the values of a plurality of instant injection amounts Qi over a period from the injection start time STSi to the injection end time ENSi in order to compute the value of a actual injection amount Qr corresponding to the actual amount of fuel injection. In other words, the ECU 71 obtains the integral value of the instant injection amount Qi over the period from the injection start time STSi to the injection end time ENSi.

At the next step 1240, the ECU 71 reads the value of an injection amount Q0, used at the time of the previous fuel injection, in a separate "fuel injection amount control routine" which will be discussed later.

At step 1250, the ECU 71 subtracts the currently acquired actual injection amount Qr from the previous injection amount Q0, sets the subtraction result as an injection amount difference ΔQ, and then temporarily terminates the subsequent processing.

According to the above-described "ΔQ computing routine", therefore, every time single fuel injection is performed, the actual injection amount Qr is obtained based on the values of a plurality of fuel pressures P(i) over the period from the injection start time STSi to the injection end time ENSi. That is, with the period from the injection start time STSi to the injection end time ENSi taken as an injection period, where the actual fuel injection has been carried out, the value of the actual injection amount Qr over that injection period is obtained. Further, the difference between the value of the previous injection amount Q0 and the value of the actual injection amount Qr is obtained as the injection amount difference ΔQ. This value allows the ECU 71 to adjust the amount of fuel in the next fuel injection cycle. The values of Q0 and Qr are stored in the RAM 83.

Figure 29:
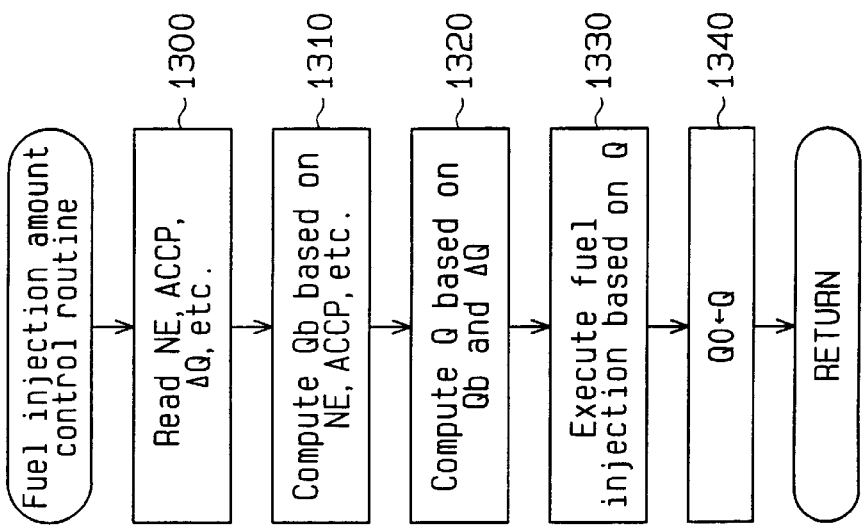
Figure 30:
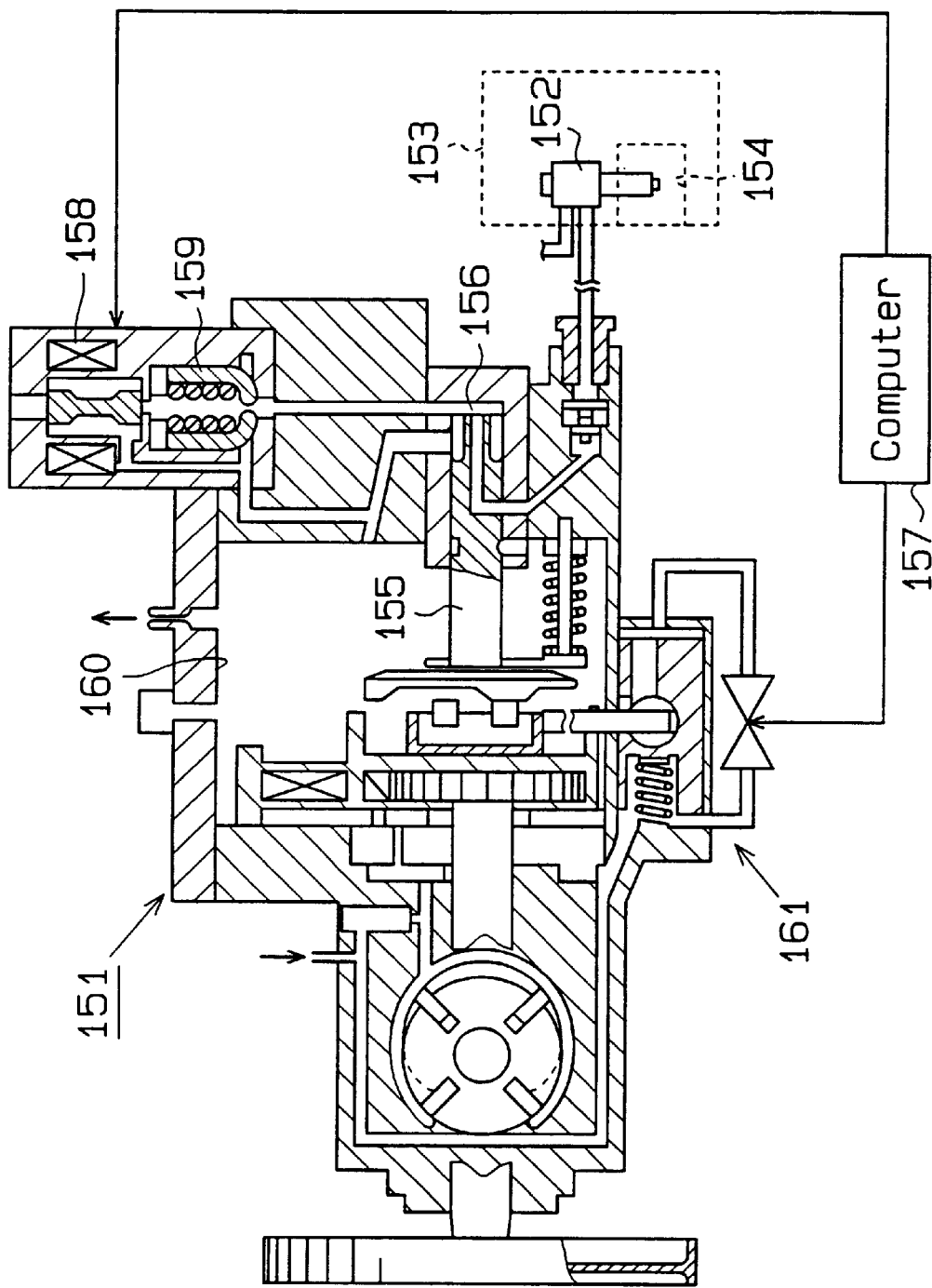
FIG. 30 is a cross-sectional view showing a conventional fuel injection pump, etc.

In this embodiment, the ECU 71 executes the fuel injection amount control as follows using the acquired injection amount difference ΔQ as compensation data. FIG. 29 presents the flowchart which illustrates the contents of the "fuel injection amount control routine" which the ECU 71 periodically executes using the aforementioned injection amount difference ΔQ.

When the ECU 71 enters this routine, it reads the values of the engine speed NE, the acceleration pedal angle ACCP, etc., obtained from the engine speed sensor 35, acceleration pedal sensor 73, etc., at step 1300. The ECU 71 also reads the injection amount difference ΔQ obtained in the "ΔQ computing routine".

At the next step 1310, the ECU 71 computes the value of a basic injection amount Qb according to the driving condition at each instant from a predetermined equation, based on the values of the engine speed NE, the acceleration pedal angle ACCP, etc.

At step 1320, the ECU 71 computes the value of the current target injection amount Q based on the values of the basic injection amount Qb and injection amount difference ΔQ. In this embodiment, the ECU 71 employs a method of adding the injection amount difference ΔQ to the basic injection amount Qb in order to compute the value of the target injection amount Q. This method allows the ECU 71 to use the most recently acquired injection amount difference amount ΔQ. Alternatively, a simple average of a plurality of old injection amount differences ΔQ obtained in the past together with the latest injection amount difference ΔQ may be added to the basic injection amount Qb. Injection amount difference ΔQ may, on the other hand, be determined by learning control techniques.

At step 1330, the ECU 71 executes fuel injection based on the value of the currently acquired target injection amount Q. More specifically, the ECU 71 controls the electromagnetic spill valve 23 based on the value of the target injection amount Q to control the feeding of the fuel under pressure from the injection pump 1 to the injection nozzle 4, thereby adjusting the amount of fuel injection from the injection nozzle 4.

Then, the ECU 71 sets the value of the target injection amount Q, used in the current fuel injection, as the value of the previous injection amount Q0 at step 1340, and temporarily terminates the subsequent processing.

According to the fuel injection control of this embodiment, as described above, at the time the fuel is injected from the injection nozzle 4, the value of the fuel pressure P in the fuel system including the fuel line 4a is detected by the pressure sensor 47. Further, the ECU 71 analyzes the frequency component fd of the fuel pressure P based on the detected value of the fuel pressure P. Further, the analyzed frequency component fd is compared with the previously stored frequency of the needle valve vibration fn of the injection nozzle 4. The time at which both values fd and fn match is set as the injection start time STSi.

The time at which the fuel pressure frequency fd equals the frequency of the nozzle vibration fn defines the time at which fuel injection starts, i.e. STSi. Consequently, the injection start time STSi is based on the fluctuation of the fuel pressure P. The injection start time STSi is properly determined regardless of any changes in fuel characteristics in the fuel system or of any time-dependent changes in the component parts of fuel system. This allows the ECU 71 to accurately control the injection start time STSi despite changes in the rotational speed of the engine 2.

Likewise, the result of analysis of the frequency component fd is compared with the previously stored frequency of the columnar vibration fp in the fuel line 4a in this embodiment. The time at which both values fd and fp match is set as the injection end time ENSi.

The time when the fuel pressure frequency fd matches the value of the frequency of the columnar vibration fp corresponds to the time at which the factor of the fluctuation of the fuel pressure P changes to the frequency of the columnar vibration fp in the fuel line 4a due to the closing of the injection nozzle 4. Accordingly, the injection end time ENSi is specified based on the frequency component fd of the fuel pressure P. The injection end time ENSi is properly determined regardless of the difference in the properties of the fuel including fuel viscosity in the fuel system and regardless of any time-dependent changes in the component parts of the fuel system. This allows the ECU 71 to accurately control injection end time ENSi despite changes in the rotational speed of the engine 2.

Further, since an abnormality in the injection pump 1, etc. is diagnosed based on the injection end time ENSi in this embodiment, it is possible to turn on the alarm lamp 66 to inform the driver of an abnormality in the fuel system. Furthermore, based on the abnormality-oriented diagnose code, it is possible to check whether or not there is an abnormality in the fuel system at the time of the regular inspection of the engine 2.

In addition, every time single fuel injection is executed, the value of the actual injection amount Qr is obtained. The difference between the injection amount Qr and the injection amount Q0 at the time of that injection is set as the injection amount difference ΔQ. Fuel injection is performed based on a new target injection amount Q, adjusted by the injection amount difference ΔQ. That is, the fuel injection amount control is executed in such a way that the actual injection amount Qr matches the target injection amount Q.

According to this embodiment, therefore, even if the fuel system's component parts exhibit wear or if manufacturing tolerances are exceeded with respect to the component parts, or the amount of fuel injected will be such that the injection amount Qr matches the target injection amount Q for each instance of fuel injection. Consequently, high-precision fuel injection control over the amount of fuel injected can be maintained over long periods of time.

For example, even if the cam plate 8 or roller ring 9 in the injection pump 1 wears out, changing the stroke length of the plunger 12, the amount of fuel to be injected from the injection nozzle 4 will not increase due to that change. As another example, when the opening pressure of the seat valve in the injection nozzle 4 drops, the amount of fuel to be injected from the injection nozzle 4 will not increase. Still yet even when the fuel temperature in the injection pump 1 rises, the amount of fuel to be injected from the injection nozzle 4 and the fuel injection start time will not change. It is therefore possible to control the amount of fuel injected with a high degree of precision in response to various engine operating conditions. Two consequences of this are improved fuel economy and decreased exhaust gas emissions.

Further, since the injection amount Qr is obtained based on the injection start and end times STSi and ENSi respectively, the injection amount Qr for correcting the target injection amount Q can be accurately obtained. In this respect, the precision of the fuel injection amount control can be improved even further.

Although only seven embodiments of the present invention have been described herein, it should be apparent to those skilled in the art that the present invention may be embodied in many other specific forms without departing from the spirit or scope of the invention. Particularly, it should be understood that this invention may be embodied in the following forms.

According to the first and second embodiments, the fuel injection amount and fuel injection timing are compensated on the basis of the bulk modulus AE or the like obtained from the frequency of the fuel pressure. However, various parameters such as EGR may be compensated based on the bulk modulus AE or the like.

According to the third and fourth embodiments, the accumulated value TdP, representative of a plurality of fuel pressure changes dP obtained over a period from the beginning of the fuel supply under pressure to the beginning of fuel injection can be averaged to acquire an average fuel pressure change AdP. A fuel pressure change dP over a range from the beginning of the fuel supply under pressure to the beginning of fuel injection can be computed at the time of fuel injection. An average fuel pressure change AdP can thereby be obtained using previous observed fuel pressure changes dP. Alternatively, the average fuel pressure change AdP may be acquired through learning control techniques.

Although the pressure sensor 47 for detecting the fuel pressure P is provided midway in the fuel line 4*a* in the third and fourth embodiments, the pressure sensor may be provided in the injection nozzle or in the high pressure chamber in the injection pump.

According to the fifth embodiment, the fuel grade is determined based on the damping ratio D of the frequency of the fuel pressure. Fuel injection amount and fuel injection timing are adjusted in accordance with this fuel grade. The fuel injection amount and fuel injection timing may however be compensated directly based on the damping ratio D.

Although an abnormality in the fuel system is diagnosed on the basis of the detected injection end time ENSi in the sixth and seventh embodiments, the fuel injection amount or fuel injection timing may be compensated based on the difference between the detected injection end time ENSi and the target injection end time.

Although the target injection amount Q is corrected on the basis of the detected injection start time STSi and injection end time ENSi to compensate the fuel injection amount in the seventh embodiment, the fuel injection timing may be compensated based on the detected injection start time STSi and injection end time ENSi.

Although the fuel injection apparatus of this invention is adapted for the diesel engine 2 in the above-described embodiments, the present invention can also be applied to other engines than the diesel engine as long as the engines have a fuel injection apparatus equipped with a fuel injection pump and injection nozzles.

Therefore, the present examples and embodiments are to be considered as illustrative and not restrictive and the invention is not to be limited to the details given herein, but may be modified within the scope of the appended claims.

What is claimed is:

1. A fuel injection apparatus comprising:
    a fuel injection pump connected with a plurality of fuel injection nozzles by way of a plurality of fuel passages;
    first decision means for determining a desired fuel injection amount;
    second decision means for determining a final injection control amount in consideration of a property of the fuel, the second decision means comprising:
        detecting means for detecting the fuel pressure in each fuel passage;
        computing means for computing a parameter representing the property of the fuel in accordance with the detected fuel pressure;
        correction means for correcting an injection control amount in accordance with the computed parameter to obtain the final injection control amount, wherein the injection control amount is determined by the operating status of an engine to accomplish the desired fuel injection amount; and
        control means for controlling the injection pump in accordance with the final injection control amount so that the injection pump is pumping out the desired fuel injection amount under high pressure at a required timing; wherein the parameter represents the bulk modulus of the fuel.

2. The fuel injection apparatus as set forth in claim 1, wherein the bulk modulus of the fuel is calculated based on the frequency of fuel pressure fluctuation, which is computed in accordance with the detected fuel pressure.

3. The fuel injection apparatus as set forth in claim 1, wherein the parameter is based on a damping value of the frequency of fuel pressure fluctuation.

4. The fuel injection apparatus as set forth in claim 1, wherein the bulk modulus of the fuel is calculated based on a change of the detected fuel pressure.

5. A fuel injection apparatus comprising:
    a fuel injection pump connected with a plurality of fuel injection nozzles by way of a plurality of fuel passages;
    first decision means for determining a desired fuel injection amount;
    second decision means for determining a final injection control amount in consideration of a property of the fuel, the second decision means comprising:
        detecting means for detecting the fuel pressure in each fuel passage;
        computing means for computing a parameter representing the property of the fuel in accordance with the detected fuel pressure;
        correction means for correcting an injection control amount in accordance with the computed parameter to obtain the final injection control amount, wherein the injection control amount is determined by the operating status of an engine to accomplish the desired fuel injection amount;
        control means for controlling the injection pump in accordance with the final injection control amount so that the injection pump is pumping out the desired fuel injection amount under high pressure at a required timing, wherein the parameter is based on the frequency of fuel pressure fluctuation; and
        third decision means for determining an injection termination time, wherein the injection termination time is a time when the computed fuel pressure frequency and a stored columnar frequency of the fuel passage coincide, wherein the desired fuel injection amount is injected based on the determined injection termination time.

6. The fuel injection apparatus as set forth in claim 5 further comprising:
    fourth decision means for determining an injection initiation time, wherein the fuel injection initiation time is a time when the computed fuel pressure frequency and a stored eigenfrequency for the fuel injection nozzle coincide, wherein the desired fuel injection amount is injected based on the determined injection initiation time.

7. A fuel injection apparatus for correcting an injection control amount to precisely supply a desired fuel injection amount to an engine from a fuel injection pump through a plurality of fuel passages and a plurality of fuel injection nozzles, wherein the injection control amount is determined in accordance with the operating status of the engine, the fuel injection apparatus comprising:
    detecting means for detecting the fuel pressure in each fuel passage;
    computing means for computing a parameter representing a fuel property in accordance with the detected fuel pressure;
    correction means for correcting the injection control amount in accordance with the computed parameter; and
    control means for controlling the injection pump in accordance with the corrected injection control amount, wherein the injection pump pumps out the desired fuel injection amount under high pressure at a required timing, wherein the parameter represents the bulk modulus of the fuel.

8. The fuel injection apparatus as set forth in claim 7, wherein the bulk modulus of the fuel is calculated based on the frequency of fuel pressure fluctuation, which is computed in accordance with the detected fuel pressure.

9. A fuel injection apparatus for correcting an injection control amount to precisely supply a desired fuel injection amount to an engine from a fuel injection pump through a plurality of fuel passages and a plurality of fuel injection nozzles, wherein the injection control amount is determined in accordance with the operating status of the engine, the fuel injection apparatus comprising:

detecting means for detecting the fuel pressure in each fuel passage;

computing means for computing a parameter representing a fuel property in accordance with the detected fuel pressure;

correction means for correcting the injection control amount in accordance with the computed parameter; and control means for controlling the injection pump in accordance with the corrected injection control amount, wherein the injection pump pumps out the desired fuel injection amount under high pressure at a required timing, wherein the parameter is based on a damping value of the frequency of fuel pressure fluctuation.

10. The fuel injection apparatus as set forth in claim 7, wherein the bulk modulus of the fuel is calculated based on a change of the detected fuel pressure.

11. A fuel injection apparatus for correcting an injection control amount to precisely supply a desired fuel injection amount to an engine from a fuel injection pump through a plurality of fuel passages and a plurality of fuel injection nozzles, wherein the injection control amount is determined in accordance with the operating status of the engine, the fuel injection apparatus comprising:

detecting means for detecting the fuel pressure in each fuel passage;

computing means for computing a parameter representing a fuel property in accordance with the detected fuel pressure;

correction means for correcting the injection control amount in accordance with the computed parameter;

control means for controlling the injection pump in accordance with the corrected injection control amount, wherein the injection pump pumps out the desired fuel injection amount under high pressure at a required timing, wherein the parameter is based on the frequency of fuel pressure fluctuation; and second decision means for determining an injection initiation time, wherein the fuel injection initiation time is a time when the computed fuel pressure frequency and a stored eigenfrequency for the fuel injection nozzle coincide, wherein the fuel injection control is performed based on the determined initiation time.

12. A method of correcting an injection control amount to precisely inject a desired fuel amount to an engine from a plurality of injection nozzles, the method comprising:

detecting fuel pressure in each of a plurality of fuel passages connecting the injection nozzles and a fuel injection pump;

computing a parameter representing a fuel property in accordance with the detected fuel pressure;

correcting the injection control amount in accordance with the computed parameter, and controlling the injection pump in accordance with the corrected injection control amount, wherein the parameter represents the bulk modulus of the fuel.

13. The method as set forth in claim 12, wherein the bulk modulus of the fuel is calculated based on the frequency of fuel pressure fluctuation, which is computed in accordance with the detected fuel pressure.

14. A method of correcting an injection control amount to precisely inject a desired fuel amount to an engine from a plurality of injection nozzles, the method comprising:

detecting fuel pressure in each of a plurality of fuel passages connecting the injection nozzles and a fuel injection pump;

computing a parameter representing a fuel property in accordance with the detected fuel pressure;

correcting the injection control amount in accordance with the computed parameter, and controlling the injection pump in accordance with the corrected injection control amount, wherein the parameter is based on a damping value of the frequency of fuel pressure fluctuation.

15. The method as set forth in claim 12, wherein the bulk modulus of the fuel is calculated based on a change of the detected fuel pressure.

16. A method of correcting an injection control amount to precisely inject a desired fuel amount to an engine from a plurality of injection nozzles, the method comprising:

detecting fuel pressure in each of a plurality of fuel passages connecting the injection nozzles and a fuel injection pump;

computing a parameter representing a fuel property in accordance with the detected fuel pressure;

correcting the injection control amount in accordance with the computed parameter.

controlling the injection pump in accordance with the corrected injection control amount, wherein the parameter is based on the frequency of fuel pressure fluctuation; and determining an injection termination time, wherein the injection termination time is a time when the computed fuel pressure frequency and a stored columnar frequency of the fuel passage coincide, and controlling the fuel injection based on the determined injection termination time.

17. A method of correcting an injection control amount to precisely inject a desired fuel amount to an engine from a plurality of injection nozzles, the method comprising:

detecting fuel pressure in each of a plurality of fuel passages connecting the injection nozzles and a fuel injection pump;

computing a parameter representing a fuel property in accordance with the detected fuel pressure;

correcting the injection control amount in accordance with the computed parameter, controlling the injection pump in accordance with the corrected injection control amount, wherein the parameter is based on the frequency of fuel pressure fluctuation; and determining an injection initiation time, wherein the fuel injection initiation time is a time when the computed fuel pressure frequency and a stored eigenfrequency for the fuel injection nozzle coincide, and controlling the fuel injection based on the determined injection initiation time.

18. A fuel injection apparatus having a fuel injection pump connected with a plurality of fuel injection nozzles by way of a plurality of fuel passages, wherein the injection pump pumps out a desired amount of fuel under high pressure at a required timing, wherein said fuel is supplied to the injection nozzles through the fuel passages to be injected to an engine from the injection nozzles, said injection apparatus comprising:

detecting means for detecting fuel pressure in each fuel passage;

computing means for computing a parameter representing a fuel property in accordance with the detected fuel pressure;

correction means for correcting an injection control amount of the fuel being injected in accordance with the computed parameter; and control means for controlling the injection pump in accordance with the corrected injection control amount, wherein the parameter represents the bulk modulus of the fuel.

19. The fuel injection apparatus as set forth in claim 18, wherein the bulk modulus of the fuel is calculated based on the frequency of fuel pressure fluctuation, which is computed in accordance with the detected fuel pressure.

20. A fuel injection apparatus having a fuel injection pump connected with a plurality of fuel injection nozzles by way of a plurality of fuel passages, wherein the injection pump pumps out a desired amount of fuel under high pressure at a required timing, wherein said fuel is supplied to the injection nozzles through the fuel passages to be injected to an engine from the injection nozzles said injection apparatus comprising:

detecting means for detecting fuel pressure in each fuel passage;

computing means for computing a parameter representing a fuel property in accordance with the detected fuel pressure;

correction means for correcting an injection control amount of the fuel being injected in accordance with the computed parameter; and control means for controlling the injection pump in accordance with the corrected injection control amount, wherein the parameter is based on a damping value of the frequency of fuel pressure fluctuation.

21. The fuel pressure apparatus as set forth in claim 18, wherein the bulk modulus of the fuel is calculated based on a change of the detected fuel pressure.

22. A fuel injection apparatus having a fuel injection pump connected with a plurality of fuel injection nozzles by way of a plurality of fuel passages, wherein the injection pump pumps out a desired amount of fuel under high pressure at a required timing, wherein said fuel is supplied to the injection nozzles through the fuel passages to be injected to an engine from the injection nozzles, said injection apparatus comprising:

detecting means for detecting fuel pressure in each fuel passage;

computing means for computing a parameter representing a fuel property in accordance with the detected fuel pressure;

correction means for correcting an injection control amount of the fuel being injected in accordance with the computed parameter;

control means for controlling the injection pump in accordance with the corrected injection control amount, wherein the parameter is based on the frequency of fuel pressure fluctuation; and first decision means for deciding an injection termination time, wherein the injection termination time is a time when the computed fuel pressure frequency and a stored columnar frequency of the fuel passage intersect;

wherein the fuel injection control is implemented based on the decided injection termination time.

23. The fuel pressure apparatus as set forth in claim 22 further comprising:

second decision means for deciding an injection initiation time, wherein the fuel injection initiation time is a time when the computed fuel pressure frequency and a stored eigenfrequency for the fuel injection nozzle intersect;

wherein the fuel injection control is performed based on the decided injection initiation time.

* * * * *

UNITED STATES PATENT AND TRADEMARK OFFICE
CERTIFICATE OF CORRECTION

PATENT NO. : 6,102,000
DATED : 15 August 2000
INVENTOR(S) : Kenichiro SHINDOH et al.

It is certified that error appears in the above-identified patent and that said Letters Patent is hereby corrected as shown below:

In the title page: Change the filing date of "JP 6-000617" form "Jan. 1, 1994" to --Jan. 7, 1994--.

| Column | Line | |
|---|---|---|
| 2 | 59 | Change "devices" to --device--. |
| 3 | 53 | After "illustrate" insert --a third embodiment of the present--. |
| 3 | 63 | Change "4th" to --5th--. |
| 4 | 5 | Change "5th" to --6th--. |
| 4 | 17 | Change "6th" to --7th--. |
| 6 | 28 | After "increase" insert --,--. |
| 10 | 30 | After "reads" insert --,--. |
| 12 | 50 | Change "isamp" to --Tsamp--. |
| 23 | 60 | Change "EdU" to --ECU--. |

UNITED STATES PATENT AND TRADEMARK OFFICE
CERTIFICATE OF CORRECTION

PATENT NO. : 6,102,000
DATED : 15 August 2000
INVENTOR(S) : Kenichiro SHINDOH et al.

Page 2 of 2

It is certified that error appears in the above-identified patent and that said Letters Patent is hereby corrected as shown below:

| Column | Line | |
|---|---|---|
| 10 | 30 | After "reads" insert --,--. |
| 12 | 50 | Change "isamp" to --Tsamp--. |
| 23 | 60 | Change "EdU" to --ECU--. |
| 26 | 55 | Change "defect" to --detect--. |
| 26 | 61 | Change "illustrate" to --illustrates--. |
| 29 | 39 | After "match" insert --,--; after "indicates" delete ",". |

Signed and Sealed this

Twenty-fourth Day of April, 2001

Attest:

NICHOLAS P. GODICI

*Attesting Officer*     Acting Director of the United States Patent and Trademark Office